United States Patent
Frank et al.

(10) Patent No.: US 10,657,536 B2
(45) Date of Patent: May 19, 2020

(54) AUTOMATIC CORRELATION OF ACCOUNT IDENTIFIERS TO ACCOUNT ACCESSORS

(71) Applicant: Goldman Sachs Bank USA, New York, NY (US)

(72) Inventors: Aaron Frank, Oakland, CA (US); Matthew Rothstein, Davis, CA (US); Andrew Dietrich, Oakland, CA (US); Alexander Cramer, San Francisco, CA (US); Andrew Briggs, Los Angeles, CA (US)

(73) Assignee: Goldman Sachs Bank USA, New York, NY (US)

( * ) Notice: Subject to any disclaimer, the term of this patent is extended or adjusted under 35 U.S.C. 154(b) by 0 days.

(21) Appl. No.: 16/403,400

(22) Filed: May 3, 2019

(65) Prior Publication Data
US 2019/0259034 A1 Aug. 22, 2019

Related U.S. Application Data

(63) Continuation of application No. PCT/US2018/040121, filed on Jun. 28, 2018.
(Continued)

(51) Int. Cl.
*G06Q 20/40* (2012.01)
*G06Q 20/24* (2012.01)
(Continued)

(52) U.S. Cl.
CPC ....... *G06Q 20/4097* (2013.01); *G06F 21/604* (2013.01); *G06Q 20/24* (2013.01); *G06Q 20/405* (2013.01); *G06Q 20/42* (2013.01)

(58) Field of Classification Search
CPC ........ G06Q 40/00; G06Q 30/00; G06Q 20/00; G06Q 10/00
(Continued)

(56) References Cited

U.S. PATENT DOCUMENTS 7,104,443 B1 * 9/2006 Paul ................... G06Q 20/105
 235/375
7,502,760 B1 * 3/2009 Gupta ................. G06Q 20/367
 705/64
(Continued)

FOREIGN PATENT DOCUMENTS

KR 10-1144930 B1 5/2012
KR 10-2012-0076521 A 7/2012
WO WO 2017/044836 A1 3/2017

OTHER PUBLICATIONS

Hayashi, "The New Debit Card Regulations: Effects on merchants, consumers and payments system efficiency", Economic Review, First Quarter 2013. (Year: 2013).*
(Continued)

*Primary Examiner* — Frantzy Poinvil
(74) *Attorney, Agent, or Firm* — Fenwick & West LLP

(57) ABSTRACT

An access management system includes a database configured to store access data including account identifiers and accessor identifiers, wherein the access data indicates particular accounts that have been accessed by particular accessors. The access management system also includes a computer system that receives a reservation request comprising an account identifier and an accessor identifier and determines whether the account identifier is included in the database. The computer system also determines, in response to the account identifier being present in the database, whether the access data correlates the account identifier to the accessor and authorizes the reservation of the one or more resources in the account by the accessor in response to the access data correlating the account identifier to the accessor.

20 Claims, 18 Drawing Sheets

Related U.S. Application Data

(60) Provisional application No. 62/526,310, filed on Jun. 28, 2017, provisional application No. 62/526,315, filed on Jun. 28, 2017.

(51) Int. Cl.
  *G06Q 20/42* (2012.01)
  *G06F 21/60* (2013.01)

(58) Field of Classification Search
  USPC ........................................................ 705/3–44
  See application file for complete search history.

(56) References Cited

U.S. PATENT DOCUMENTS

| | | | | |
|---|---|---|---|---|
| 7,840,486 | B2* | 11/2010 | D'Agostino | G06Q 20/02 705/44 |
| 8,046,268 | B2* | 10/2011 | Hunt | G06Q 20/102 705/26.1 |
| 8,200,545 | B2* | 6/2012 | Hunt | G06Q 20/102 705/26.1 |
| 8,423,453 | B1* | 4/2013 | Elliott | G06Q 20/10 705/35 |
| 8,682,784 | B2* | 3/2014 | Schleicher | G06Q 20/02 705/21 |
| 8,799,067 | B2* | 8/2014 | Fordyce, III | G06Q 30/0229 705/14.3 |
| 8,973,820 | B2* | 3/2015 | Milner | G06Q 20/105 235/380 |
| 2011/0022628 | A1 | 1/2011 | Kramer et al. | |
| 2013/0346264 | A1* | 12/2013 | Falkenborg | G06Q 40/02 705/30 |
| 2014/0236831 | A1 | 8/2014 | Flitcroft et al. | |
| 2015/0186908 | A1* | 7/2015 | Taskin | G06Q 30/0204 705/7.33 |
| 2016/0055514 | A1* | 2/2016 | Loomis | G06Q 30/0226 705/14.33 |
| 2016/0140535 | A1* | 5/2016 | Noe | G06Q 20/10 705/39 |
| 2016/0358167 | A1 | 12/2016 | Van Os et al. | |
| 2017/0061534 | A1* | 3/2017 | Vergari | G06Q 20/4016 |
| 2017/0070484 | A1 | 3/2017 | Kruse et al. | |

OTHER PUBLICATIONS

Kuttner et al, Personal On-Line Payments, FRBNY Economic Policy Review , Dec. 2001. (Year: 2001).*

PCT International Search Report and Written Opinion, PCT Application No. PCT/US2018/040121, dated Nov. 5, 2018, 17 pages.

* cited by examiner

FIG. 6

RESTRICTION DATA 108

TEMPLATE MAPPING 600

| ACCESSOR CATEGORY 602 | ACCESSOR SUBCATEGORY 604 | TEMPLATE IDENTIFIER 606 |
|---|---|---|
| 1 | 3 | MARKET |
| 2 | 4, 5 | RESTAURANT |
| 3 | NULL | Mickey's Market |
| 4 | NULL | Donald's Restaurant |
| 5 | NULL | Bob's Burgers |

| TEMPLATE IDENTIFIER 606 | TEMPLATE PROPERTIES 608 | | |
|---|---|---|---|
| | REQUEST AMOUNT 610 | REQUEST FREQUENCY 612 | REQUEST VELOCITY 614 |
| MARKET | $200 | ONCE MONTHLY | $200 MONTHLY |
| RESTAURANT | $50 | TWICE WEEKLY | $100 WEEKLY |
| Mickey's Market | $100 | ONCE WEEKLY | $100 WEEKLY |
| Donald's Restaurant | $50 | ONCE WEEKLY | $50 WEEKLY |
| Bob's Burgers | $10 | TWICE DAILY | $20 DAILY |

FIG. 7

MAPPING 700

| ACCOUNT ID 702 | STATUS 704 | LAST ACCESS DATE 706 |
|---|---|---|
| 4384031234567890 | USED | 6/8/13 |
| 4384031233567890 | CLOSED | 2/15/11 |
| 4384031234367890 | CLOSED | 2/15/12 |
| 4384031234537890 | CLOSED | 2/15/14 |
| 4384031233337890 | USED | 11/6/15 |

FIG. 10 Expiration Date Restrictions

| 1004 ACCOUNT ID | 1006 STATUS | EXPIRATION DATE 1008 |
|---|---|---|
| 4384031234567890 | CLOSED | 2/15/11 |
| 4384031233567890 | OPEN | 1/25/26 |
| 4384031234367890 | CLOSED | 2/15/14 |
| 4384031234537890 | OPEN | 11/6/25 |
| 4384031233337890 | CLOSED | 11/6/15 |

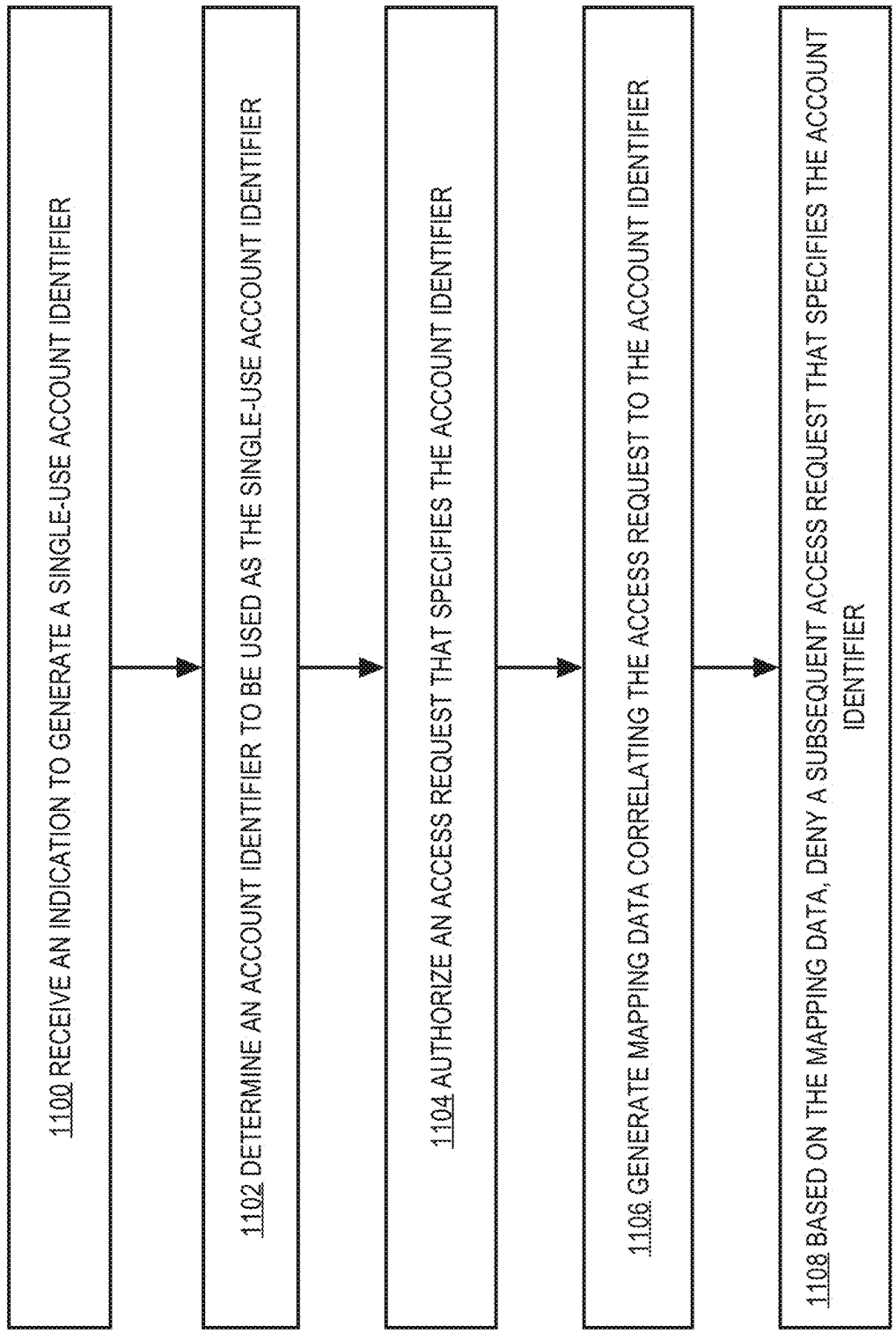

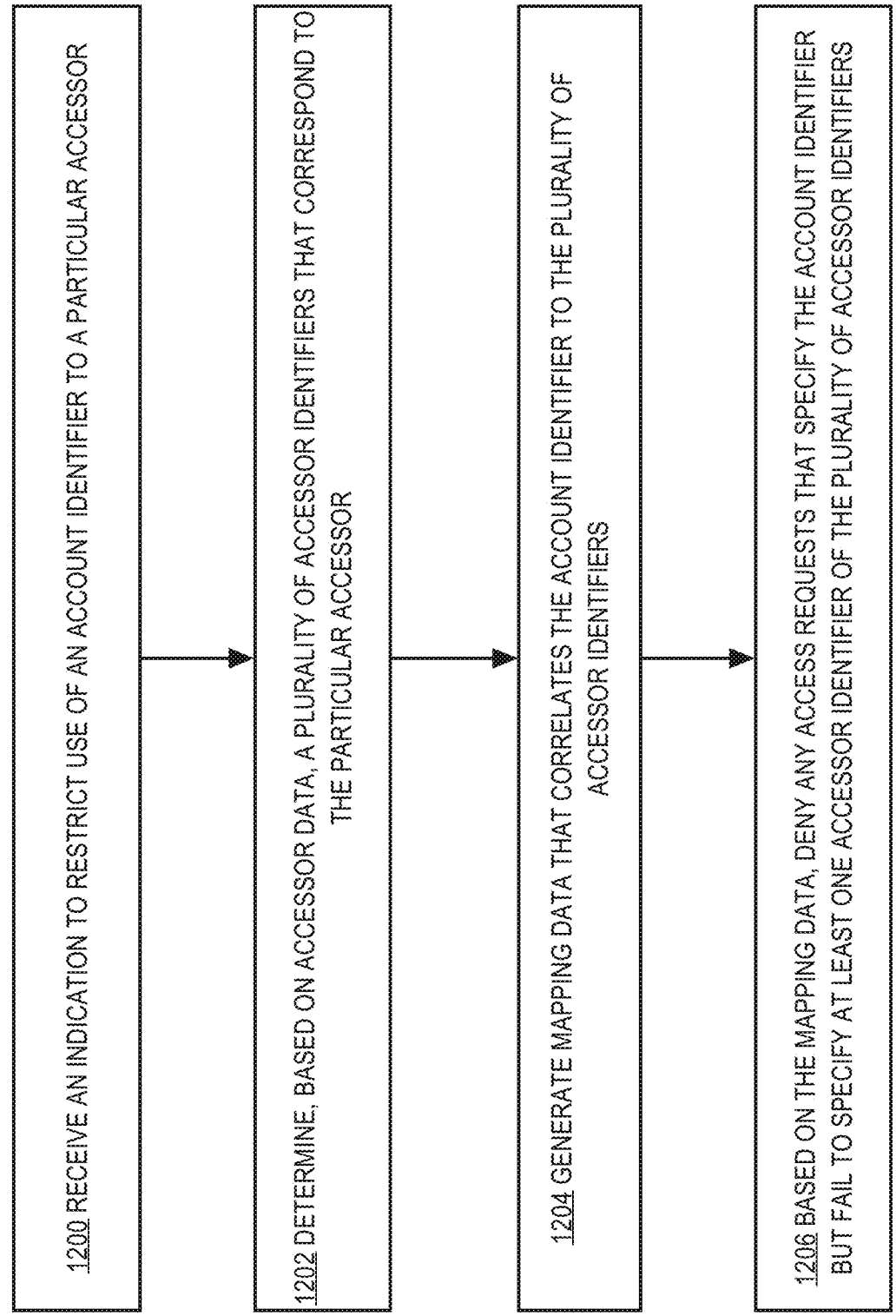

AUTOMATIC CORRELATION OF ACCOUNT IDENTIFIERS TO ACCOUNT ACCESSORS

CROSS-REFERENCE TO RELATED APPLICATIONS

This application is a continuation of PCT Application US2018/040121, filed Jun. 28, 2018, which claims the benefit of U.S. Provisional Applications 62/526,310 and 62/526,315, both filed Jun. 28, 2017. All of these applications are incorporated by reference.

FIELD OF THE DISCLOSURE

The general technical field of the disclosure is digital information security and, more specifically, access controls relating to use of digital information.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Access controls may be used to regulate who has permission to access certain resources, such as information, land, personal property, money, or any other item of value. However, vulnerabilities in access controls may develop or be discovered. Such vulnerabilities may be remedied by replacing the access controls, but this can be a costly and time-consuming process. Furthermore, until the access controls are replaced, resources may be unavailable, even to people who have a right to access them.

Attempts to reduce the expense of replacing access controls have typically been focused on limiting the scope of access controls. For example, resources may be compartmentalized into accounts that are each associated with a separate access control. Thus, if one account is compromised, the other accounts remain unaffected. However, limiting the scope of access controls does not change the fact that when an account is compromised, replacing the associated access controls is still a costly and time-consuming process that renders resources temporarily inaccessible.

Digitizing access controls has also had some effect in reducing the amount of time and money typically involved in replacing access controls. For example, instead of replacing the entire infrastructure associated with a mechanical access control, replacing a digital access control may involve replacing or reprogramming affected components of the infrastructure. Nevertheless, the downtime and costs associated with replacing even digital access controls may still be significant.

Thus, an approach for further reducing the downtime associated with replacing access controls would improve the usability and effectiveness of access control technology.

BRIEF DESCRIPTION OF THE DRAWINGS

The disclosed embodiments have advantages and features which will be more readily apparent from the detailed description, the appended claims, and the accompanying figures.

FIG. 6 illustrates a restriction data template, according to one embodiment.

FIG. 7 is a table illustrating an approach for determining the eligibility of account identifiers for recycling, according to one embodiment.

FIG. 10 is a table illustrating an example of expiration date restrictions associated with account identifiers, according to one embodiment.

FIG. 11 is a flowchart illustrating an approach for implementing single-use account identifiers, according to one embodiment.

FIG. 12 is a flowchart illustrating an approach for implementing accessor-specific account identifiers, according to one embodiment.

Figure 1:
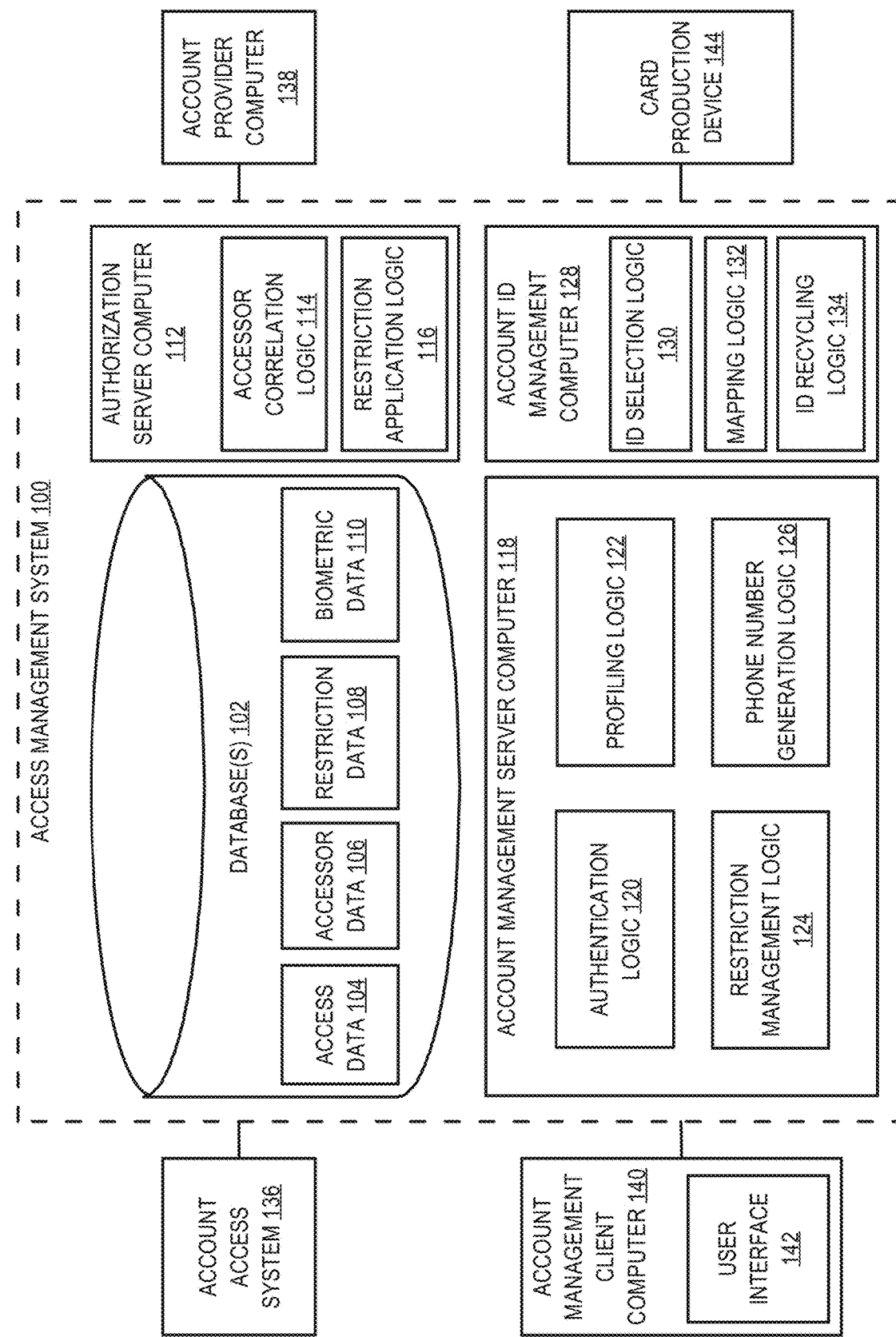
FIG. 1 is a block diagram illustrating an example computer architecture for managing access to resources, according to one embodiment.

While each of the figures illustrates a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order. References to particular objects or components in the singular should be understood to be for purposes of explanation, and implementations of the described embodiments may use any number of such items to perform the described functions.

1.0 General Overview

In some embodiments, resources are maintained in accounts. For example, gym memberships for different individuals may be maintained in different accounts. One or more account identifiers correspond to each account. Zero or more restrictions are applied to each account identifier. Example restrictions include a single-use restriction, an accessor-specific restriction, a card-present/absent restriction, a biometrics-based restriction, or a geolocation-based restriction. For example, a single-use account identifier may be generated for a guest accessor of an account.

Access to the resources of an account may be regulated using a virtual card and/or a physical card. In some example embodiments, the physical card is an account identification card that has a plurality of different interfaces. Example interfaces include a visually readable interface (e.g., having printed or embossed account details), a magnetically readable interface, or a microchip-based interface. A different account identifier may correspond to each different interface of the physical card.

At times, users may desire assistance managing accounts. Typically, assistance is provided telephonically by a call recipient who verifies whether or not a caller is authorized to access a particular account. The verification process can be time-consuming, annoying, and/or error-prone. In lieu of this verification process, a caller may be connected with a call recipient via a dynamically generated phone number. The dynamically generated phone number indicates, to the call recipient, that the caller is authorized to access the particular account.

Account identifiers may be limited to a finite set of possibilities (e.g., a set of 16-digit account identifiers used by the account provider). Thus, in some example embodiments, the use of account identifiers may be monitored to enable recycling of account identifiers if certain criteria are satisfied.

In various embodiments, an access management system 100 is managed by a bank or other financial institution. The bank issues cards (either physical or virtual) to account holders. The cards may be associated with multiple account identifiers (e.g., 16-digit numbers) that are each mapped to the same account with the bank. In one embodiment, different account identifiers may be mapped to different interfaces of the card (e.g., an visual interface printed or embossed on the card, a magnetic stripe, and an integrated circuit). Thus, if one account identifier or interface becomes compromised, it may be disabled without preventing the account holder from using the other interfaces of the card. For example, if a credit card number embossed on the card is obtained by a bad actor, it may be disabled while the account holder retains the ability to make purchases using the magnetic stripe and integrated circuit interfaces. Thus, the account holder may not completely lose access to their account while waiting for a new card to be issued.

In another embodiment, account identifiers may be assigned to specific merchants. For example, a virtual card (e.g., stored in a user's smartphone) may be associated with multiple account identifiers. Each account identifier may be assigned such that only a single merchant (or a type of merchant, subset of merchants, etc.) is authorized to make transactions using that account identifier. Thus, a customer may walk into a store, tap their smartphone on a payment scanner, and have it automatically provide the account identifier for that merchant, authorizing the transaction (assuming any other requirements for authorization of the transaction are met). In contrast, if the user's bank receives a transaction request for the account identifier from a different entity (e.g., another merchant), the transaction may be denied. In some embodiments, the user's card may be assigned several account identifiers that are initially not assigned to a particular merchant. When the user makes a transaction with a merchant that is not yet assigned an account identifier, one of the unassigned identifiers may be assigned to that merchant. That account identifier will then be locked to that merchant, with any transaction received from other entities using that account identifier being refused authorization.

2.0 Network Topology

FIG. 1 illustrates an example computer architecture for managing access to resources, according to one embodiment. Referring to FIG. 1, access management system 100 is communicatively coupled to account access system 136, account provider computer 138, account management client computer 140, and card production device 144. In other embodiments, the computer architecture may include different and/or additional elements. In addition, the functions may be distributed among the elements in a different manner than described.

A computer may include one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. A computer may be a client and/or a server. Any reference to a computer herein may mean one or more computers, unless expressly stated otherwise.

While some of the elements are depicted and described herein as if implemented on a separate, remote computer from each other, this is done for explanation purposes only and one or more of the elements may be part of and/or executed on the same computer. Each of the logical and/or functional units depicted in the figures or described herein may be implemented using any of the techniques further described herein in connection with FIG. 18. For example, a computer may comprise a general-purpose computer configured with one or more stored programs which when executed cause performing the functions described herein for one or more logical and/or functional units; a special-purpose computer with digital logic that is configured to execute the functions; or digital logic that is used in other computing devices. While the figures include lines that indicate various devices and/or modules being communicatively coupled, each of the computers, devices, modules, storage, and logic may be communicatively coupled with each other.

2.1 Access Management System

In the example of FIG. 1, access management system 100 comprises database 102, authorization server computer 112, account management server computer 118, and account identifier management computer 128. However, in some example embodiments, authorization server computer 112, account management server computer 118, and/or account identifier management computer 128 may be different aspects of the same computer.

2.1.1 Database(s)

Database 102 may be one or more databases, one or more configuration files, and/or one or more of any other system and/or data structure that stores data. Additionally or alternatively, database(s) 102 may be one or more data structures stored in memory on one or more computers, such as authorization server computer 112, account management server computer 118, and/or account identifier management computer 128. Additionally or alternatively, database 102 may, at least in part, be a data structure stored in shared memory between one or more computers.

In the embodiment shown in FIG. 1, database 102 comprises access data 104, accessor data 106, restriction data 108, and biometric data 110. Additionally or alternatively, database 102 may store one or more categories of data that are not depicted in FIG. 1. For example, database 102 may store account identifier data indicating which account identifiers have been circulated.

Access data 104 is information indicating that one or more accounts are currently being accessed or have been accessed in the past. In some example embodiments, access data 104 comprises geolocation data, one or more timestamps, one or more account identifiers, one or more accessor identifiers, and/or any other information related to an access request. For example, access data 104 may be recorded in a database table or other mapping each time a keycard is used to open a particular door in an apartment complex.

Accessor data 106 is information related to entities including individuals, organizations, or other entities that attempt to access accounts. In some example embodiments, accessor data 106 comprises geolocation data, alphanumeric identifiers of accessors (e.g., names, user IDs, phone numbers, email addresses, etc.), or other information about accessors. For example, a database table or other mapping may store accessor data 106 for each tenant in an apartment complex.

Restriction data 108 is information that is used to enforce access controls at a higher level of granularity than at the account level. In some example embodiments, restriction data 108 comprises geolocation data, one or more accessor categories, one or more modes of access, one or more access frequencies, or other information specifying limitations on access. For example, a database table or other mapping may store restriction data 108 indicating that the maximum number of times a particular individual can access the parking garage is twice daily on weekdays.

Biometric data 110 is information related to one or more users of one or more computing devices. In some example embodiments, biometric data 110 comprises fingerprint data, facial recognition data, accelerometer data, or other information obtained from computing devices about users. For example, a database table or other mapping may store biometric data 110 that can be used to identify users based on gait analysis. Biometric data 110 can be a subset of accessor data 106 and/or restriction data 108.

2.1.2 Authorization Server Computer

Authorization server computer 112 determines whether to grant or deny account access. In the embodiment shown in FIG. 1, authorization server computer 112 comprises accessor correlation logic 114 and restriction application logic 116. In one embodiment, authorization server computer 112 receives an access request from account access system 136 and sends, to account access system 136, a decision to grant or deny the access request.

Accessor correlation logic 114 is a set of instructions that can be used to determine whether a particular account identifier corresponds to a particular accessor. In some example embodiments, the particular account identifier is included in an access request along with an identification of the particular accessor. Based on a mapping between account identifiers and accessors, accessor correlation logic 114 determines whether or not the particular accessor is authorized to access the account identified by the particular account identifier.

For example, accessor correlation logic 114 may receive, as input, the account identifier "123" and the accessor identifier "Bob". An account-identifier-to-accessor-identifier mapping may indicate that the account identifier "123" exclusively corresponds to the accessor identifier "Alice". Thus, accessor correlation logic 114 may output a denial of Bob's access request.

In some example embodiments, accessor correlation logic 114 may generate a mapping between a particular account identifier and a particular accessor. For example, accessor correlation logic 114 may determine that the particular account identifier is to be accessor-specific but is presently unassociated with any accessor. Thus, accessor correlation logic 114 may automatically generate an entry in an account-identifier-to-accessor mapping indicating that the particular account identifier corresponds to the particular accessor. For example, if a particular accessor submits an access request for an account using a particular account identifier that is currently not associated with any accessor, the accessor correlation logic 114 may create an association between the particular accessor and the particular account identifier. In other words, an account identifier may be associated with the first accessor to use it (either after creation of the identifier or after the identifier has been marked as available).

Restriction application logic 116 is a set of instructions that can be used to determine, in real time, whether or not an access request complies with one or more access restrictions indicated by restriction data 108. In some example embodiments, restriction application logic 116 may be extensible, thereby enabling a variety of access restrictions to be considered in a determination process. For example, the one or more access restrictions may be applicable to particular account identifiers, particular accessor types, or particular accessor identifiers. Restriction application logic 116 may apply multiple access restrictions in series or in parallel to converge on a determination.

For example, restriction application logic 116 may receive, as input, the accessor identifier "Bob" in a request to access the resource "network server room." Based on accessor data 106, restriction application logic 116 may determine that the accessor identifier "Bob" corresponds to a patent agent. Based on restriction data 108 indicating that only network engineers are allowed in the network server room, restriction application logic 116 may output data indicating a denial of Bob's access request.

2.1.3 Account Management Server Computer

Account management server computer 118 enables viewing past or pending account accesses, creating or modifying access restrictions, facilitating customer service communications, and any other activity related to managing an account. In the embodiment shown in FIG. 1, account management server computer 118 comprises authentication logic 120, profiling logic 122, restriction management logic 124, and phone number generation logic 126. Account management server computer 118 receives user input from account management client computer 140 and can send various data to account management client computer 140.

Authentication logic 120 is a set of instructions that can be used to verify whether or not a particular user has account management permissions. For example, authentication logic 120 may cause a user to be prompted, at account management client computer 140, for a username and password. Upon receiving, as inputs, a username and password, authentication logic 120 may compare the inputs to user data stored in database 102. Based on the results of the comparison, authentication logic 120 may cause displaying, at account management client computer 140, an error message or an account management interface.

Profiling logic 122 is a set of instructions that can be used to generate user profiles. User profiles may be generated based on data collected at account management client computer 140. The data may include user input and/or device metrics. Example device metrics include geolocation data, biometric data, accelerometer data, and/or any other information collected at a device that is communicatively coupled (either temporarily or permanently) to account management server computer 118. Profiling logic 122 may cause collected data to be organized according to associated users and stored in database 102 as user data and/or biometric data 110. In some example embodiments, the collected data may be used in combination with account identifiers to control account access. For example, a mobile computing device that digitally stores a virtual card may also provide device metrics that confirm the identity of the virtual card's user.

Restriction management logic 124 is a set of instructions that can be used to create or modify access restrictions. For example, restriction management logic 124 may receive user input from account management client computer 140. The user input may specify that a particular account identifier is to be a single-use account identifier. Restriction management logic 124 may cause data associating a single-use access restriction with the particular account identifier to be stored in database(s) 102 as restriction data 108. Restriction management logic 124 may specify other access restrictions, such as only allowing access during certain time periods, at a certain frequency, if the user is in a certain location, etc.

Phone number generation logic 126 is a set of instructions that can be used to cause dynamic generation of phone numbers corresponding to call recipients. Based on a phone number that a caller dialed to communicate with a call recipient, the call recipient can determine the caller's identity. In some example embodiments, the phone number may be ephemeral in that it is valid for a certain time period, thereby enabling the phone number to be recycled for use with different users.

For example, phone number generation logic 126 may receive, from account management client computer 140, user input indicating that a particular user wishes to speak with a customer service representative. In response to receiving the user input, phone number generation logic 126 may invoke an application programming interface (API) call to a third-party service, such as TWILIO, to generate a phone number. The API call payload may include user information, such as an email address, universally unique identifier (UUID), and/or any other data that can be used to identify a user. The third-party service may forward the user information in session initiation protocol (SIP) headers to the customer service system, which may maintain a mapping correlating the particular user to a particular session and/or a particular phone call.

2.1.4 Account Identifier Management Computer

Account identifier management computer 128 manages circulation of account identifiers. In the embodiment shown in FIG. 1, account identifier management computer 128 comprises identifier selection logic 130, mapping logic 132, and identifier recycling logic 134.

Identifier selection logic 130 is a set of instructions that can be used to determine whether or not to place a particular account identifier into circulation. Placing an account identifier into circulation may involve assigning the account identifier to one or more interfaces of an account identification card, providing the account identifier to a user, and/or otherwise making the account identifier available for use. In some example embodiments, identifier selection logic 130 may generate one or more account identifiers in response to receiving, as input, a request for one or more account identifiers to be placed into circulation. Based on data stored in database 102, identifier selection logic 130 may determine whether or not an account identifier is eligible to be placed into circulation. For example, identifier selection logic 130 may determine whether or not access data 104 includes the account identifier based on causing execution of a query over access data 104. If the account identifier is included in access data 104, identifier selection logic 130 may determine that the account identifier is ineligible to be placed into circulation and repeat execution of one or more instructions using a different account identifier. However, if the account identifier is not included in access data 104, identifier selection logic 130 may output data that causes the account identifier to be placed into circulation.

Mapping logic 132 is a set of instructions that can be used to generate or modify one or more mappings correlating account identifiers to accounts and/or account identification card interfaces. For example, mapping logic 132 may receive, as input, data indicating that a plurality of account identifiers is to be placed into circulation in association with a particular account.

Mapping logic 132 may map each of the plurality of account identifiers to the particular account. Additionally or alternatively, mapping logic 132 may map each of the plurality of account identifiers to a different interface of an account identification card. In some example embodiments, mapping data may be stored in database 102.

Identifier recycling logic 134 is a set of instructions that can be used to determine whether or not to reintroduce into circulation a particular account identifier that has been removed from circulation. The particular account identifier may have been a single-use account identifier, or the particular account identifier may be associated with an account that has been closed. The determination may be based on a variety of criteria, such as whether or not a predetermined time period has elapsed since the particular account identifier was removed from circulation. In some example embodiments, identifier selection logic 130 includes identifier recycling logic 134.

2.2 Account Access System

Account access system 136 may comprise a keypad, a magnetic stripe reader, a barcode reader, a radio frequency transceiver, a microchip reader, a camera, and/or any other device that can be used to obtain an account identifier. For example, account access system 136 may be a computing device that receives an account identifier of a virtual card stored on account management client computer 140.

2.3 Account Provider Computer

As mentioned above, authorization server computer 112 receives, as input, an access request from account access system 136. In some example embodiments, the access request may specify access to a particular amount of resources in an account. For example, the access request may specify access to $100. Thus, authorization server computer 112 may communicate with optional account provider computer 138 to determine whether or not there is a sufficient amount of resources in the account to satisfy the access request. Account provider computer 138 may be used by account providers to manage account resources. Example account providers include cloud storage providers, landlords, banks, and/or any other entity that manages account resources.

For example, authorization server computer 112 may send, to account provider computer 138, a request to verify that a particular account has a certain amount of resources available for access. Authorization server computer 112 may receive, from account provider computer 138, a response indicating whether or not the particular account has the certain amount of resources available for access. If the response indicates that the certain amount of resources is available, authorization server computer 112 may send, to account access system 136, a decision to grant the access request. Otherwise, authorization server computer 112 may send, to account access system 136, a decision to deny the access request.

2.4 Account Management Client Computer

Account management client computer 140 communicates with account management server computer 118 to enable a user to view past or pending account accesses, create or modify access restrictions, speak with a customer service representative, and/or otherwise manage an account. In the embodiment shown in FIG. 1, account management client computer 140 comprises user interface 142.

User interface 142 enables receiving input from a user and displaying data to the user. Examples of user interface 142 include a desktop or mobile browser, a natively executed application, and/or any other program that enables interaction between humans and machines.

2.5 Card Production Device

Optional card production device 144 may communicate with account identifier management computer 128 to generate account identification cards. In some example embodiments, card production device 144 may receive, from account identifier management computer 128, mapping data indicating different account identifiers that have been assigned to different interfaces of an account identification card. Based on the mapping data, card production device 144 may generate an account identification card with a different account identifier corresponding to each card interface.

3.0 Account Identification Card

Figure 2:
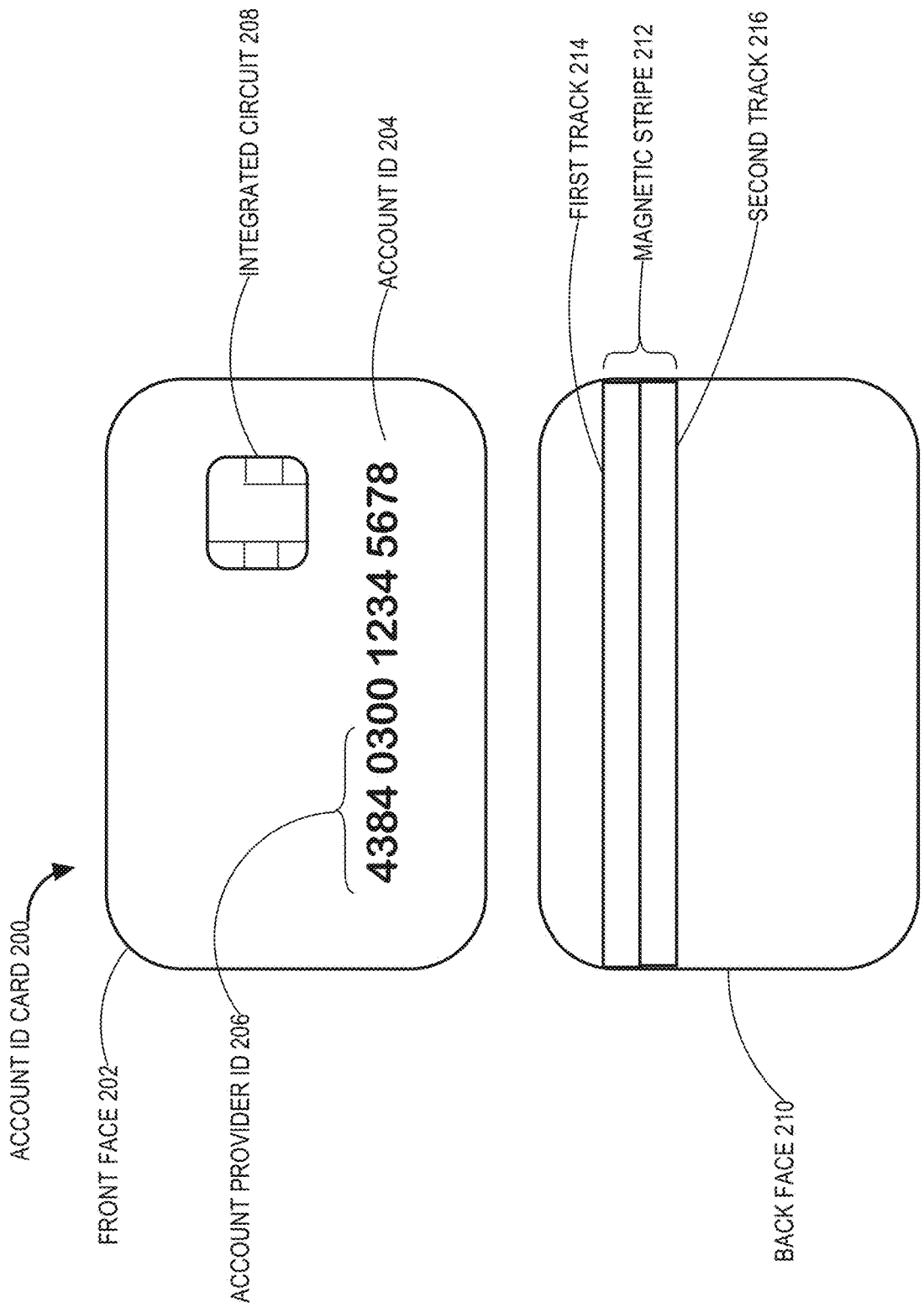
FIG. 2 depicts an example account identification card, according to one embodiment.

FIG. 2 depicts an example account identification card. Account identification cards can be made of any material, including with relatively less expensive materials such as polyvinyl chloride plastic. In the embodiment shown in FIG. 2, account identification card 200 comprises front face 202 and back face 210. Front face 202 comprises visual account identifier 204 and integrated circuit 208. Back face 210 comprises magnetic stripe 212.

3.1 Visually Readable Interface

In some example embodiments, account identification card 200 may have a visually readable interface, such as the one depicted in FIG. 2. Visual account identifier 204 may be printed, embossed, and or stored on the surface of account identification card 200 in any other manner that renders an identifier (e.g., an alphanumeric identifier) visually readable. In the example of FIG. 2, the identifier is a sixteen-digit number, the first six digits of which correspond to account provider identifier 206. Account provider identifier 206 may uniquely identify a particular account provider.

As mentioned above, a different account identifier may correspond to each card interface, yet all of the account identifiers of a particular card may correspond to an identical account. This can be achieved by varying part(s) of the account identifiers. For example, the different account identifiers of an account identification card may share identical account provider identifiers. In some example embodiments, the different account identifiers may also share an identical set of terminal identifiers, which may be the last four digits of a particular account identifier. Thus, the central six digits of a sixteen-digit identifier may vary between different account identifiers, such that checksums or other validations may be performed.

Advantageously, assigning different account identifiers to different card interfaces enables deactivating a particular account identifier without affecting other account identifiers. For example, mapping logic 132 may "dud" or otherwise cause visual account identifier 204 to become invalid based on updating mapping data stored in database(s) 102 without invalidating identifiers associated with the integrated circuit 208 or magnetic stripe 212. Thus, a cardholder may continue to access account resources using any of the card interfaces that corresponds to an account identifier that remains valid.

3.2 Magnetic Stripe

In some example embodiments, account identification card 200 may have one or more magnetically readable interfaces included in magnetic stripe 212. In the example of FIG. 2, magnetic stripe 212 comprises first track 214 and second track 216. In some example embodiments, first track 214 and second track 216 may be encoded with different account identifiers. Alternatively, first track 214 and second track 216 may be encoded with identical account identifiers.

3.3 Integrated Circuit

In some example embodiments, integrated circuit 208 may be embedded in account identification card 200. Integrated circuit 208 may be a microchip that is configured to store an account identifier. The account identifier may be obtained from integrated circuit 208 by a contact and/or contactless chip reader.

4.0 Account Management

As mentioned above, access management system 100 may provide users with any of a variety of account management features, such as monitoring past or pending account accesses, creating or modifying access restrictions, and/or making a pre-authenticated call to a customer service center. In some example embodiments, account management activities may be performed via an account management interface, such as user interface 142.

4.1 User Interface

Figure 3:
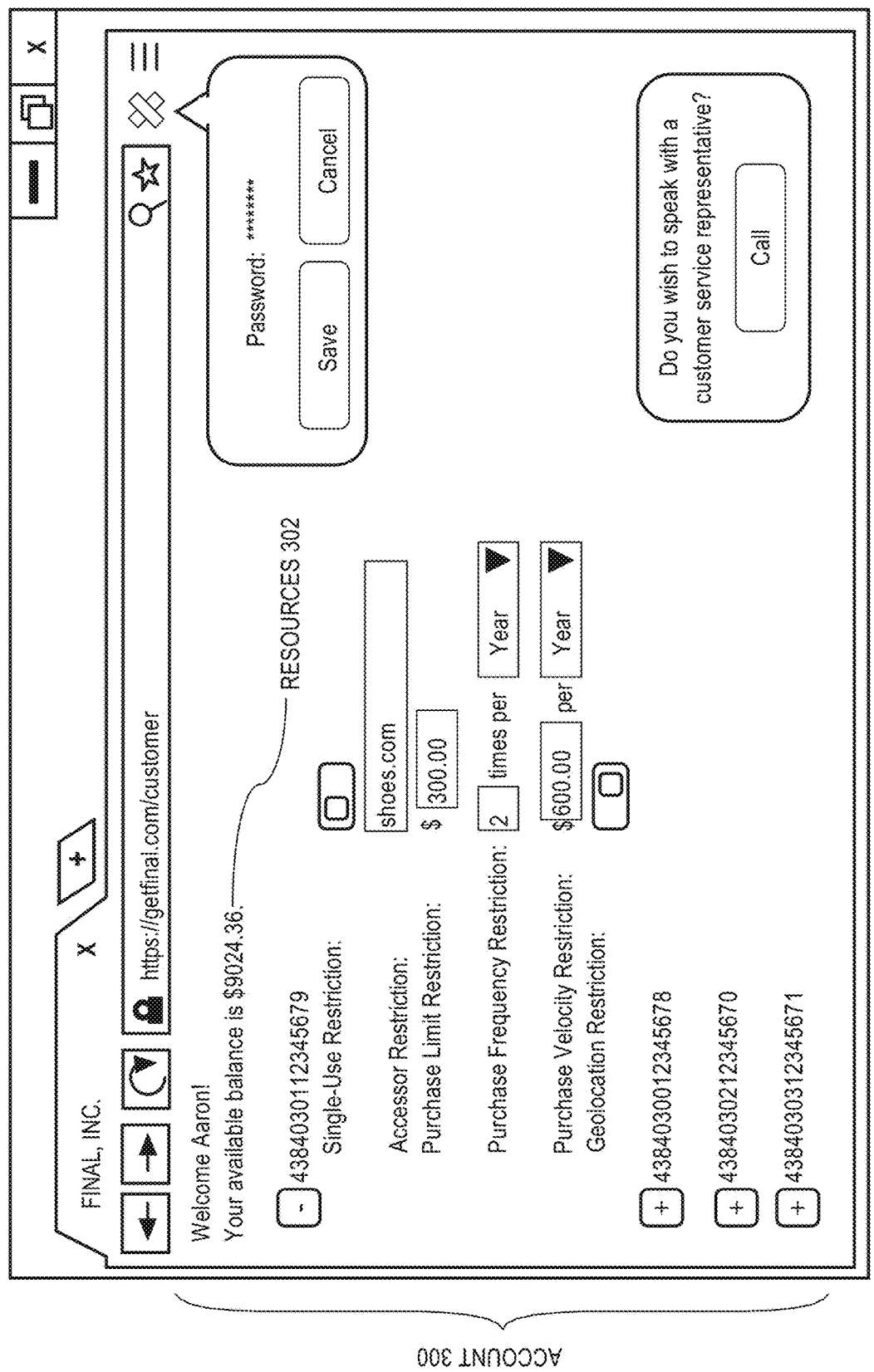
FIG. 3 depicts an example account management interface, according to one embodiment.

FIG. 3 depicts an example account management interface. In the embodiment shown in FIG. 3, user interface 142 presents information related to account 300. The information comprises a representation of resources 302.

In the example of FIG. 3, user interface 142 is a web browser that renders an account management portal. Users may log in to the portal by inputting valid authentication credentials, such as a registered username and password combination, biometric data, and/or any other data that can be used to uniquely identify users. In some example embodiments, the authentication credentials may be automatically provided to the portal, for example, via cookies or other cached data.

In FIG. 3, account 300 corresponds to a plurality of account identifiers. Each account identifier may be associated with a virtual or physical account identification card. For example, zero or more account identifiers may be derived from an account identifier corresponding to a physical card interface. A user may request generation of any number of account identifiers that are each associated with a particular account.

Zero or more access restrictions may be associated with each account identifier. Example access restrictions may include a single-use restriction, an accessor restriction, a purchase limit restriction, a purchase frequency restriction, a purchase velocity restriction, and/or a geolocation restriction.

In some example embodiments, a single-use restriction may be associated with a particular account identifier to limit the particular account identifier to a single access. For example, the particular account identifier may be a token generated for an online purchase. Thus, the first access request specifying the particular account identifier is authorized, but any subsequent access requests are denied. However, full or partial returns may still be possible based on maintaining data regarding transfers of resources.

In some example embodiments, an accessor restriction may be associated with a particular account identifier to limit the particular account identifier for use with a single accessor. In the example of FIG. 3, the particular account identifier is dedicated to providing account access to a particular merchant (shoes.com). Accessor restrictions may be manually and/or automatically associated with account identifiers. For example, a user may input an accessor identifier into a restriction field for a particular account identifier. Alternatively, access management system 100 may automatically associate a particular account identifier with an accessor identifier included in the first access request specifying the particular account identifier. In either scenario, access management system 100 may also automatically associate the particular account identifier with any other accessor identifiers corresponding to the specified accessor.

In some example embodiments, a purchase limit restriction may be associated with a particular account identifier to limit one or more access requests to a predetermined amount of resources. In the example of FIG. 3, an account identifier is limited to transactions that are less than or equal to a maximum of $300.

In some example embodiments, a purchase frequency restriction may be associated with a particular account identifier to limit access requests to a predetermined number of times for a predetermined time period. In the example of FIG. 3, an account identifier is limited to two transactions annually.

In some example embodiments, a purchase velocity restriction may be associated with a particular account identifier to limit access requests to a predetermined amount of resources for a predetermined time period. In the example of FIG. 3, an account identifier is limited to transactions totaling $600 annually. Frequency and velocity restrictions may be applied over an annual period, as illustrated in FIG. 3, or over another period such as a day, month or week, or over a custom period specified by the user.

In some example embodiments, a geolocation restriction may be associated with a particular account identifier to limit access requests to accessors that are within a predetermined distance from a particular cardholder. For example, an access request may specify an accessor identifier and an account identifier. Based on searching information stored in database 102, access management system 100 may determine first geolocation data that corresponds to the accessor identifier. Furthermore, access management system 100 may search information stored in database 102 to determine a device identifier of a mobile computing device that corresponds to the particular cardholder associated with the account identifier. Thereafter, access management system 100 may determine second geolocation data that corresponds to the account identifier based on causing collection of geolocation data from the mobile computing device. If access management system 100 determines that the first geolocation data is within a predetermined range of the second geolocation data, the access request may be granted. However, if access management system 100 determines that the first geolocation data is outside of a predetermined range of the second geolocation data, the access request may be denied. In alternative embodiments, user interface 142 enables a user to input a range limit.

In some example embodiments, user interface 142 may include a feature that enables a user to provide input indicating that the user wishes to communicate with a customer service representative via an online chat session, a telephone call, and/or any other medium for obtaining assistance with an account. In the example of FIG. 3, the feature is a "call" button that a user may select to initiate a phone call.

4.2 Customer Service Calls

Although a user may have already provided authentication credentials via user interface 142, when the user calls customer service, a customer service representative typically subjects the user to a separate authentication process nonetheless. This is because existing account management systems typically operates independently of a customer service system. That is, the account management system may be unable to share an authentication state with the customer service system and vice versa. This technical inability to authenticate the user between systems may further irritate the user, who may already be agitated by a problem with an account, and may prevent the user from completing the desired customer service or account management function. Thus, it is beneficial and desirable to enable an authenticated user to avoid being subjected to some or all of the separate authentication process of the customer service system.

Figure 4:
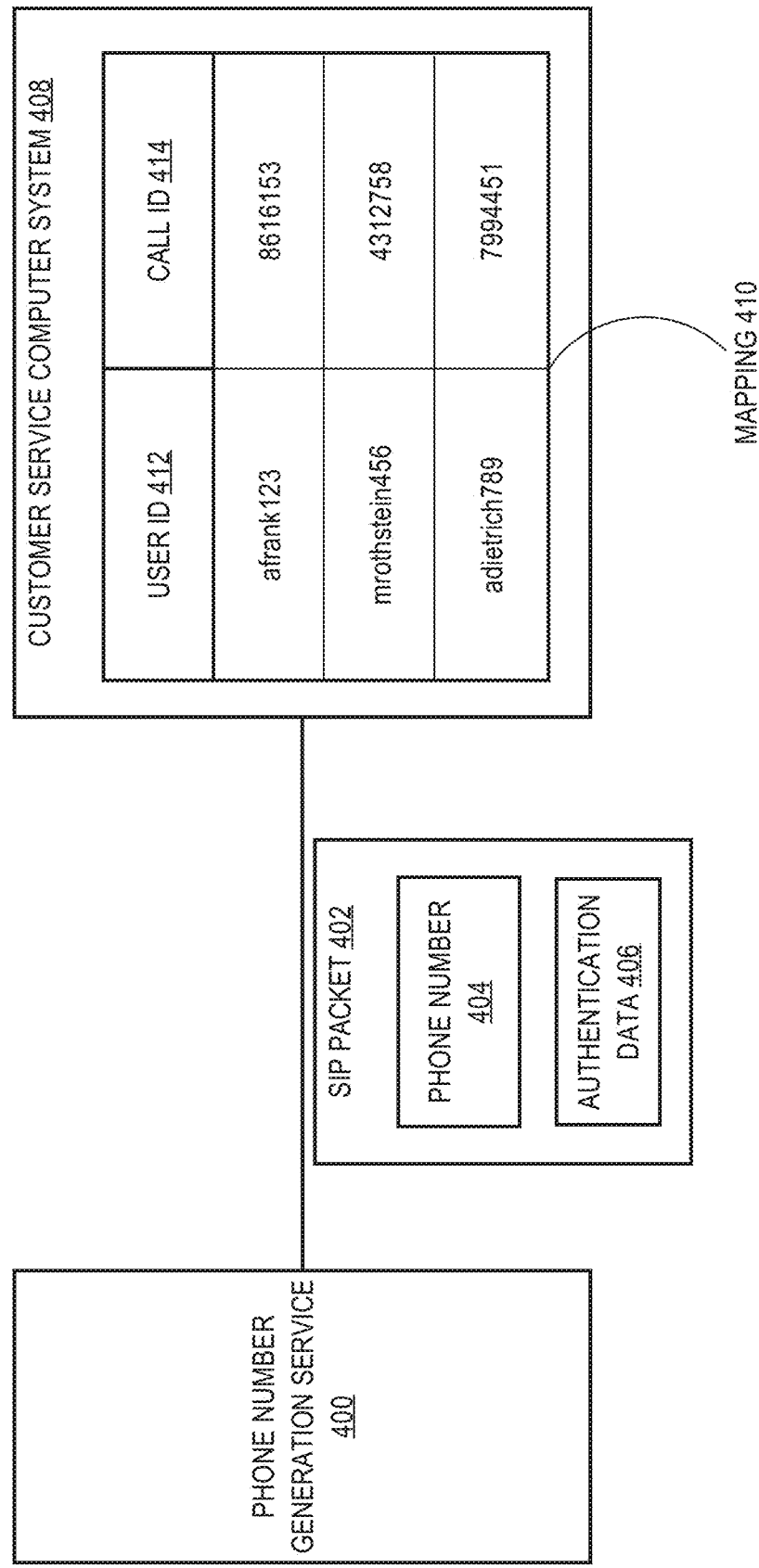
FIG. 4 illustrates an approach for pre-authenticating a user for a customer service call, according to one embodiment.

In some example embodiments, an account management system may, in effect, pre-authenticate a user for a customer service system. FIG. 4 illustrates an embodiment for pre-authenticating a user for a customer service call. In the embodiment shown in FIG. 4, phone number generation service 400 sends SIP packet 402 to customer service computer system 408. SIP packet 402 includes phone number 404 and authentication data 406.

Phone number generation service 400 may be a cloud-based service that can dynamically generate ephemeral phone numbers for a call recipient. When access management system 100 receives input indicating that account management client computer 140 is to be connected to customer service computer system 408, access management system 100 may send phone number generation service 400 a request to generate phone number 404.

In response to receiving the request, phone number generation service 400 may generate and send phone number 404 to customer service computer system 408. For example, phone number 404 may be included in header data of SIP packet 402. Phone number generation service 400 may also forward authentication data 406 to customer service computer system 408 via SIP header data (or some other appropriate method). Authentication data 406 may include user information retrieved from database 102.

In response to receiving SIP packet 402, customer service computer system 408 may generate and maintain mapping 410. In the example of FIG. 4, mapping 410 comprises user identifier 412 and call identifier 414. User identifier 412 may have been included in authentication data 406. User identifier 412 may be a username, email address, UUID, and/or any other unique reference for a user. Call identifier 414 may be phone number 404 and/or any other at least temporarily unique reference to a phone call. Advantageously, mapping 410 may enable a call recipient to determine a caller's identity as well as determine that the caller has already been authenticated based on which phone number the call recipient used to accept an incoming call.

5.0 Access Management

As mentioned above, an account identifier may be used to govern access to an account. However, account access may be governed at a higher level of granularity based on associating one or more access restrictions with the account identifier. The one or more access restrictions may be individually customized for the account identifier and/or applied to the account identifier as a set of templated restrictions.

5.1 Account Identifier Restrictions

Figure 5:
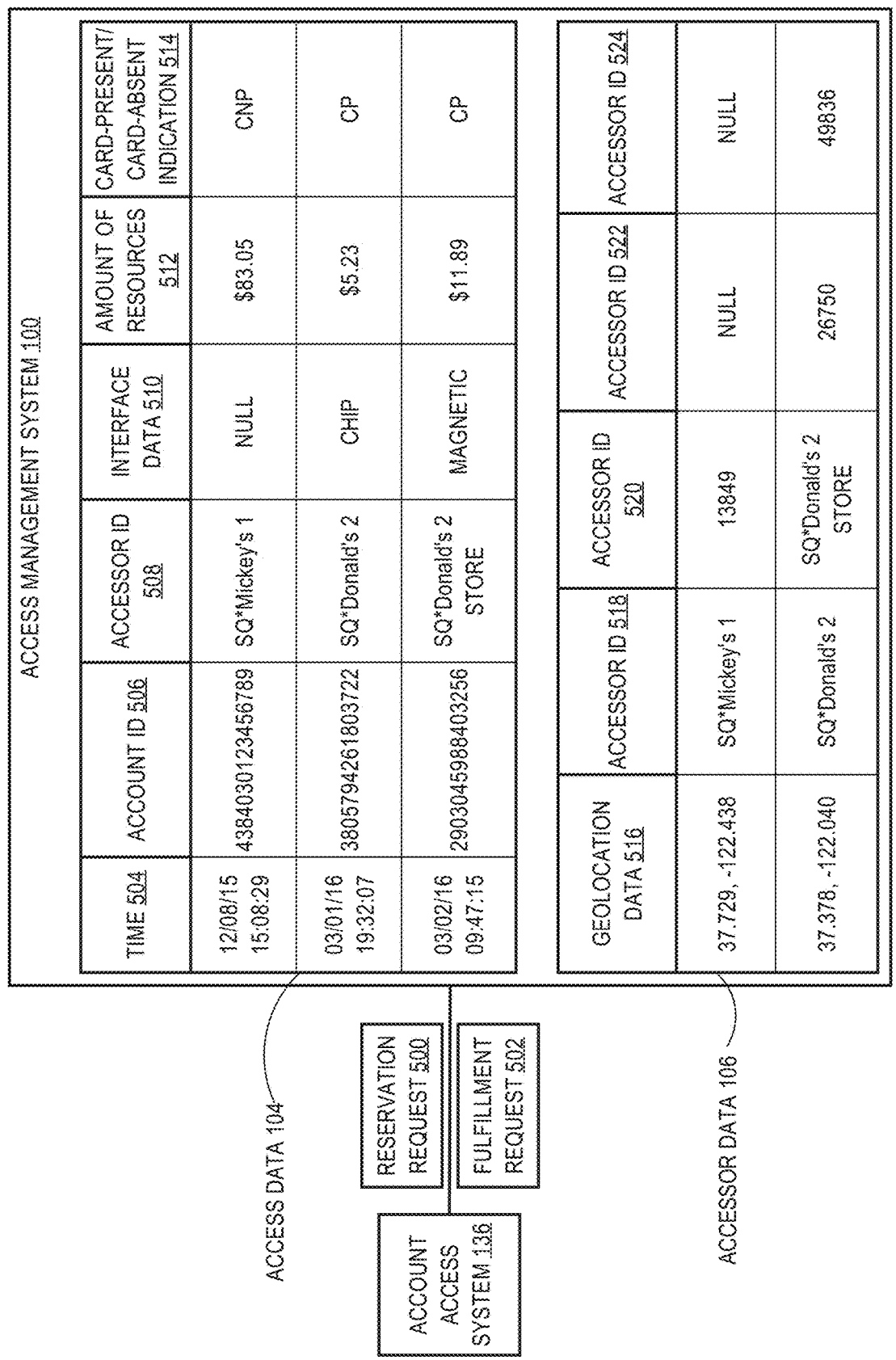
FIG. 5 illustrates data stored at an access management system, according to one embodiment.

Access restrictions may be enforced based on any of a variety of data stored at an access management system. FIG. 5 illustrates data stored at access management system 100, according to one embodiment. In the embodiment shown, account access system 136 transmits reservation request 500 and fulfillment request 502 to access management system 100, which maintains access data 104 and accessor data 106. Based on access data 104 and/or accessor data 106, access management system 100 may grant or deny an access request.

Access data 104 comprises time 504, account identifier 506, accessor identifier 508, interface data 510, amount of resources 512, and card-present/card-absent indication 514. Access management system 100 may enforce one or more access restrictions based on access data 104. For example, access management system 100 may obtain access data 104 from at least part of an access request, such as reservation request 500. Access management system 100 may search access restriction data 108 for any access restrictions that are associated with account identifier 506.

In response to determining that one or more access restrictions are associated with account identifier 506, access management system 100 may grant or deny the access request based on information included in access data 104. For example, time 504 may be used to determine whether or not an access request complies with a purchase frequency restriction and/or a purchase velocity restriction. Additionally or alternatively, amount of resources 512 may be used to determine whether or not an access request complies with a purchase limit restriction.

In some example embodiments, one or more access restrictions may be used to govern a manner in which account identifier 506 is to be obtained by account access system 136. Interface data 510 and/or card-present/card-absent indication 514 may indicate the manner in which account identifier 506 was obtained. For example, based on a mapping between account identifiers and card interfaces, access management system 100 may grant or deny an access request based on whether or not account identifier 506 was obtained using a chip reader, a magnetic reader, or some other type of account access system 136. Additionally or alternatively, access management system 100 may grant or deny an access request based on whether or not account identifier 506 corresponds to a virtual card or a physical card, such as by a "Card Present" (CP) or a "Card Not Present" (CNP) indication.

In some example embodiments, an accessor restriction may be associated with account identifier 506 such that account identifier 506 becomes an accessor-specific account identifier. Access management system 100 may search access restriction data 108 for an accessor identifier that corresponds to account identifier 506. Based on comparing the accessor identifier to accessor identifier 508, access management system 100 may determine whether or not an access request complies with an accessor restriction.

However, there may be instances when the accessor identifier and accessor identifier 508 both refer to the same accessor yet fail to match. This is because a particular accessor may be associated with multiple accessor identifiers. Furthermore, different accessor identifiers for the particular accessor may be specified in different phases of an access request or in different types of access requests.

For example, an access request may be divided into multiple phases to enable batch processing. In the example of FIG. 5, an access request comprises reservation request 500 and fulfillment request 502. Reservation request 500 may specify a particular amount of resources to be reserved for access at a later time. Fulfillment request 502 may subsequently request transfer of the reserved resources. However, reservation request 500 and fulfillment request 502 may specify different accessor identifiers, which may cause fulfillment request 502 to be denied in error.

In some example embodiments, another type of access request known as a return request may specify a different accessor identifier from reservation request 500 and/or fulfillment request 502. This may cause the return request to be denied in error.

To avoid denying access to an account in error, access management system 100 may maintain accessor data 106. In the example of FIG. 5, accessor data 106 comprises accessor identifiers 518-524. Accessor identifiers 518-524 are organized according to corresponding accessors. Access management system 100 may automatically correlate accessor identifiers 518-524 based on detecting similarities in access data 104. In some example embodiments, access management system 100 may correlate different accessor identifiers based on detecting a similarity of access behavior. For example, the different accessor identifiers may consistently request access to a similar amount of resources. Additionally or alternatively, access management system 100 may correlate different accessor identifiers based on detecting a common identifier that is shared by the different accessor identifiers. For example, both of the accessor names "SQ*Donald's 2" and "SQ*Donald's 2 STORE" may correspond to the numeric identifier "26750". Additionally or alternatively, access management system 100 may correlate different accessor identifiers based on detecting a similarity between the different accessor identifiers. For example, access management system 100 may determine that the accessor names "SQ*Donald's 2" and "SQ*Donald's 2 STORE" correspond to the same accessor, because the accessor names are sufficiently similar. In one embodiment, two accessor names are considered likely to correspond to the same accessor if the distance between them (e.g., a Levenshtein distance) is less than a threshold, which may be selected by the implementer.

Referring to FIG. 5, each row of accessor identifiers 518-524 corresponds to a particular accessor. Thus, access management system 100 may search accessor data 106 to determine whether or not accessor identifier 508 corresponds to a particular accessor to which account identifier 506 is restricted.

In some example embodiments, a geographic restriction may be associated with account identifier 506. To enforce the geographic restriction, access management system 100 may compare geolocation data collected at a cardholder's mobile computing device (e.g., the device's current location) to geolocation data 516 stored as accessor data 106. If the difference between the geolocation data and geolocation data 516 exceeds a predetermined threshold, an access request may be denied. Otherwise, the access request may be granted.

In some example embodiments, access management system 100 may enforce a geographic restriction based on monitoring changes in a cardholder's geolocation data between access requests. For example, access management system 100 may compare first geolocation data collected at a cardholder's mobile computing device at time T1 with second geolocation data collected at a cardholder's mobile computing device at time T2. If the difference between the first geolocation data and the second geolocation data exceeds a predetermined threshold, an access request may be denied. Otherwise, the access request may be granted.

5.2 Accessor Restrictions

In some example embodiments, multiple access restrictions may be associated with a particular account identifier using one or more restriction templates corresponding to a particular accessor and/or accessor type. FIG. 6 illustrates one embodiment of a restriction data template that is part of the restriction data 108. In the embodiment shown in FIG. 6, restriction data template comprises template mapping 600 and template properties 608.

A restriction template may include a plurality of access restrictions that can be applied to an access request by default. The access restrictions may be stored in the restriction template as template properties 608. In the example of FIG. 6, template properties 608 comprise template identifier 606, request amount 610, request frequency 612, and request velocity 614. In some example embodiments, template properties 608 may be modified manually and/or automatically. For example, template properties 608 may be automatically adjusted, using machine learning or some other heuristic, based on historical access patterns.

Template identifier 606 may be an alphanumeric reference to a particular restriction template. In the example of FIG. 6, each template identifier 606 refers to a restriction template that is represented as a row in a table. Template identifier 606 may correspond to a particular accessor and/or a particular type of accessor. For example, the template identifier "Mickey's Market" correspond to a particular accessor, and the template identifier "MARKET" corresponds to a particular type of accessor.

Request amount 610 may correspond to a limit, such as a maximum, on the amount of resources that can be specified in an access request. In some example embodiments, request amount 610 is a purchase limit restriction.

Request frequency 612 may correspond to a limit, such as a maximum, on the number of times an account can be accessed within a particular time period. In some example embodiments, request frequency 612 is a purchase frequency restriction.

Request velocity 614 may correspond to a limit, such as a maximum, on the amount of resources that is accessed within a particular time period. In some example embodiments, request velocity 614 is a purchase velocity restriction.

Restriction data 108 may also comprise a mapping between restriction templates and information included in access requests. In the example of FIG. 6, template mapping 600 comprises accessor category 602 and template identifier 606. Accessor category 602 may be included in an access request to describe a particular type of accessor. In one embodiment, template mapping 600 correlates accessor category 602 to template identifier 606, thereby enabling access management system 100 to apply a corresponding set of template properties 608 to the access request.

Some restriction templates may exhibit a hierarchical relationship with other restriction templates. For example, the template identifier "MARKET" may correspond to a more generalized restriction template than the one corresponding to the template identifier "Mickey's Market". Thus, the "MARKET" restriction template may be hierarchically superior to the "Mickey's Market" restriction template. As such, the "Mickey's Market" restriction template may inherit from and/or override the "MARKET" restriction template.

In some example embodiments, template mapping 600 may also comprise accessor subcategory 604 to indicate hierarchical relationships between restriction templates. For example, an access request may specify the accessor category "1" and an accessor identifier corresponding to "Mickey's Market". Access management system 100 may refer to template mapping 600 to determine if any restriction templates are applicable to the access request. Based on template mapping 600, access management system 100 may determine that the "MARKET" restriction template is applicable to the access request. However, template mapping 600 may indicate that the "Mickey's Market" restriction template is also applicable to the access request. Since the "Mickey's Market" restriction template is hierarchically inferior to the "MARKET" restriction template, access management system 100 may apply the "Mickey's Market" restriction template to the access request. If access management system 100 determines that the access request complies with all properties of the "Mickey's Market" restriction template, access management system 100 may grant the access request. Otherwise, access management system 100 may deny the access request.

In some example embodiments, access management system 100 automatically applies restriction templates in response to determining that one or more criteria are satisfied. For example, the one or more criteria may be satisfied by determining a user preference for applying restriction templates, determining that an access request specifies an accessor category, determining that accessor-specific templates are available, and/or determining that historical access data conforms to properties of restriction templates.

FIG. 10 illustrates an example of expiration date restrictions associated with account identifiers. In the embodiment shown, a table or mapping 1002 comprises a plurality of rows corresponding to distinct cards or carriers in which each row has a value in an account identifier column 1004, a status column 1006, and an expiration date column 1008. The account identifier column 1004 specifies a unique account identifier associated with and representing the account; the status column 1006 specifies a current status of the account; and the expiration date column 1008 specifies an expiration date value acting as a restriction on access. Thus, if the current date is after the expiration date, access to account resources may be denied. Additionally, once the expiration date has passed (or a certain amount of time after it has passed, such as three years), the access management system 100 may recycle the account identifier by making it available to be assigned to a new card.

6.0 Account Identifier Management

Access management system 100 generates account identifiers from a finite set of possibilities. For example, there are a limited number of unique combinations of sixteen-digit numbers. At some point, the finite set of possible account identifiers will become exhausted. Thus, access management system 100 may recycle used account identifiers that satisfy one or more criteria. FIG. 7 is a table that illustrates an approach for determining the eligibility of account identifiers for recycling. In the embodiment shown in FIG. 7, mapping 700 comprises account identifier 702, status 704, and last access date 706.

In some example embodiments, access management system 100 may maintain mapping 700 to monitor used account identifiers for possible re-introduction into circulation. For example, candidates for recycling may include single-use account identifiers that have already been used and/or account identifiers that correspond to closed accounts. Access management system 100 may select candidates for recycling based on status 704, which may indicate that account identifier 702 is "USED" or "CLOSED". Furthermore, access management system 100 may select, from the candidates, account identifiers to be recycled based on last access date 706. If the difference between the current date and last access date 706 exceeds a predetermined threshold, access management system 100 may recycle account identifier 702. For example, if account identifier 702 has been out of circulation for more than three years, access management system 100 may recycle account identifier 702.

7.0 Process Overviews

FIGS. 8-17 illustrate various techniques related to access controls. Each of the techniques may be implemented by one or more components of access management system 100.

7.1 Assigning Interface-Specific Identifiers

Figure 8:
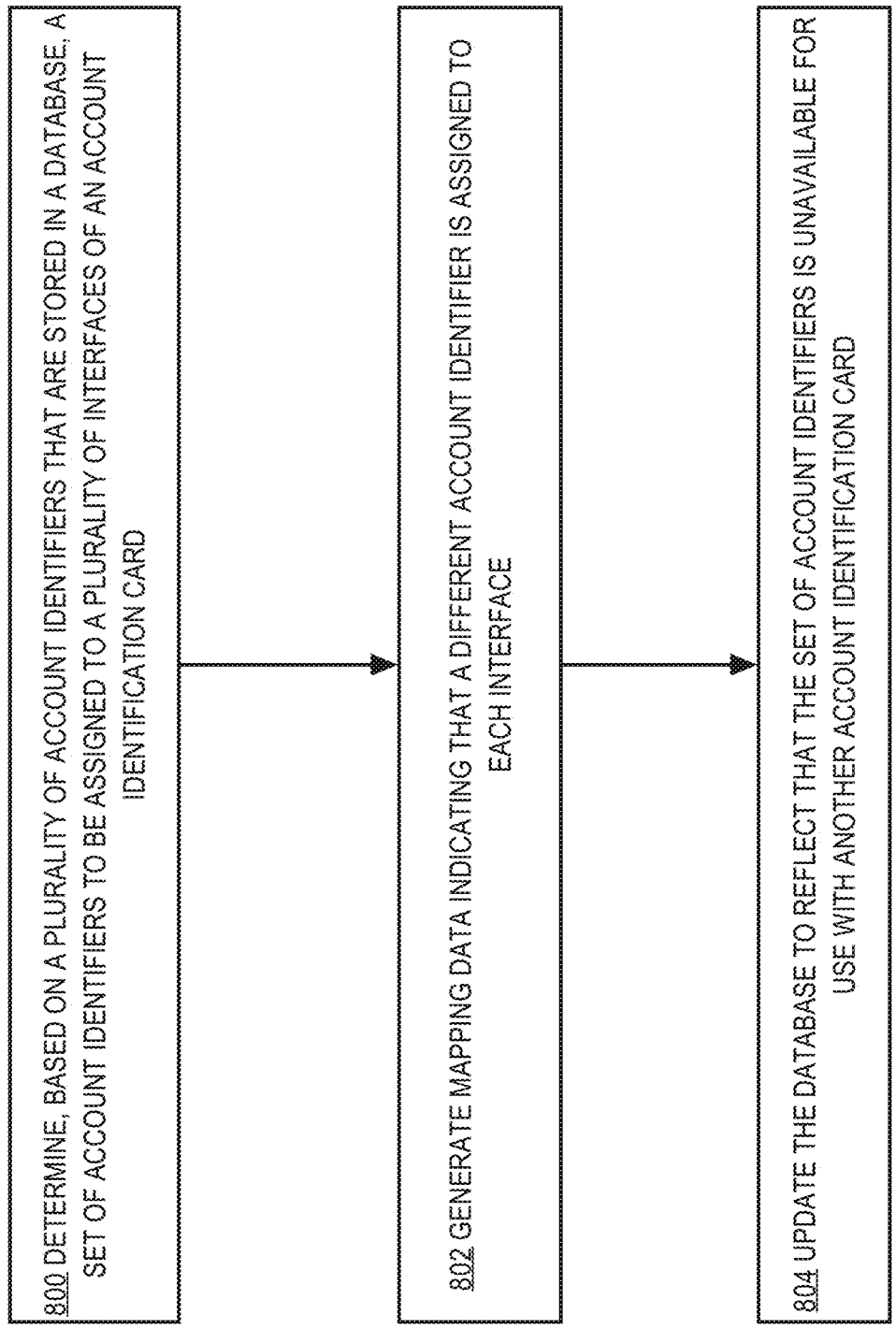
FIG. 8 is a flowchart illustrating an approach for assigning interface-specific account identifiers, according to one embodiment.

FIG. 8 is a flowchart illustrating an approach for assigning interface-specific account identifiers, according to one embodiment. At block 800, access management system 100 determines a set of account identifiers based on a plurality of account identifiers that are stored in a database. Each account identifier in the set of account identifiers is to be assigned to a plurality of interfaces of an account identification card. The account identification card may be physical or virtual.

For example, access management system 100 may generate a plurality of potential account identifiers and compare each potential account identifier to a plurality of circulated account identifiers that are stored in a database. Any potential account identifiers that fail to match a circulated account identifier may be included in the set of account identifiers to be assigned to card interfaces.

Each account identifier in the set of account identifiers is unique within the set of account identifiers. However, in some example embodiments, each account identifier in the set of account identifiers independently identifies the same account. In some example embodiments, each account identifier in the set of account identifiers includes a same account provider identifier.

In some example embodiments, the plurality of interfaces includes a visually readable face of the account identification card. Additionally or alternatively, the plurality of interfaces includes one or more tracks of a magnetic stripe. Additionally or alternatively, the plurality of interfaces includes an integrated circuit.

At block 802, access management system 100 generates mapping data indicating that a different account identifier of the set of account identifiers is assigned to each interface of the plurality of interfaces. In some example embodiments, the mapping data is provided to a card production device that fixes the set of account identifiers in the plurality of interfaces according to the mapping data.

At block 804, access management system 100 updates the database to reflect that the set of account identifiers is unavailable for use with another account identification card. For example, access management system 100 may store each account identifier in the set of account identifiers in a list of circulated account identifiers.

In some example embodiments, access management system 100 may restrict, based on the mapping data, use of each account identifier of the set of account identifiers to a corresponding interface of the plurality of interfaces. In some example embodiments, access management system 100 may cause a particular account identifier of the set of account identifiers to become invalid without causing any other account identifiers of the set of account identifiers to become invalid. In some example embodiments, access management system 100 may thereafter reuse the particular account identifier as a valid account identifier for an account that was previously unassociated with the particular account identifier.

7.2 Pre-Authenticating Users for Phone Calls

Figure 9:
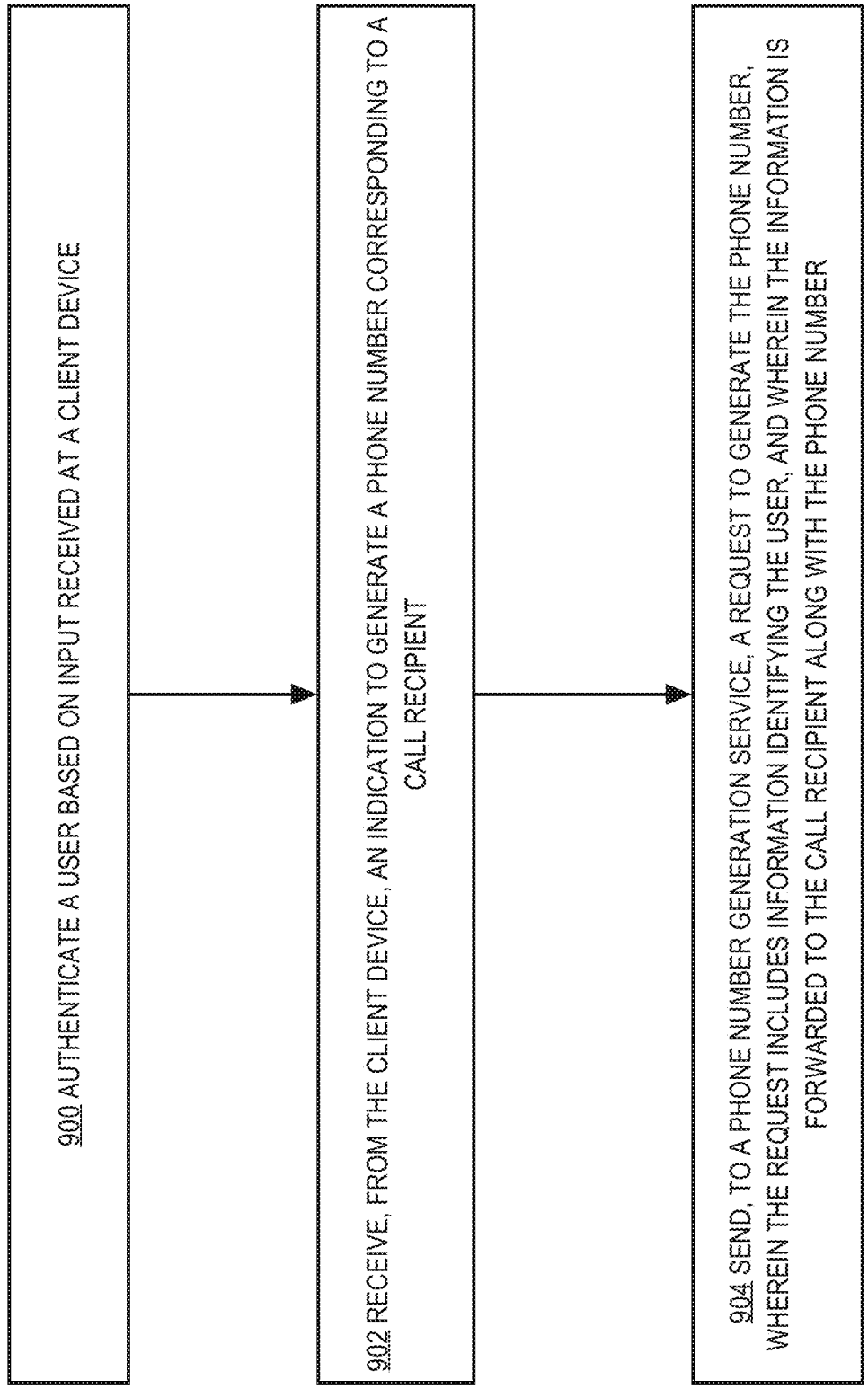
FIG. 9 is a flowchart illustrating an approach for pre-authenticating a user for a phone call, according to one embodiment.

FIG. 9 is a flowchart illustrating an approach for pre-authenticating a user for a phone call, according to on embodiment. At block 900, access management system 100 authenticates a user based on input received at a client device. The input may be a username and password combination.

At block 902, access management system 100 receives, from the client device, an indication to generate a phone number corresponding to a call recipient. In some example embodiments, the phone number may be an ephemeral phone number that is dynamically generated.

At block 904, access management system 100 sends, to a phone number generation service, a request to generate the phone number. The request may include information identifying the user. Furthermore, the information may be forwarded to the call recipient along with the phone number.

In some example embodiments, the call recipient may maintain a mapping between the phone number and the information. Thus, when the call recipient receives a call at the phone number, the call recipient may determine, based on the mapping, that the user initiated the call.

7.3 Implementing Single-Use Account Identifiers

FIG. 11 is a flowchart illustrating an approach for implementing single-use account identifiers, according to one embodiment. At block 1100, access management system 100 receives an indication to generate a single-use account identifier.

At block 1102, access management system 100 determines an account identifier to be used as the single-use account identifier. For example, access management system 100 may generate a potential account identifier and compare it to a list of circulated account identifiers stored in a database. If the potential account identifier fails to match any of the circulated account identifiers, access management system 100 may send it to a client device for use as a single-use account identifier.

At block 1104, access management system 100 authorizes an access request that specifies the account identifier. The access request is the first access request to specify the account identifier.

At block 1106, access management system 100 generates mapping data correlating the access request to the account identifier. The mapping data may be historical access data that is stored in a database.

At block 1108, access management system 100 denies, based on the mapping data, a subsequent access request that specifies the account identifier. In some example embodiments, the subsequent access request is not a return request, which may have authorized at any time after block 1104.

7.5 Implementing Access Specific Account Identifiers

FIG. 12 is a flowchart illustrating an approach for implementing accessor-specific account identifiers, according to one embodiment. At block 1200, access management system 100 receives an indication to restrict use of an account identifier to a particular accessor.

At block 1202, access management system 100 determines, based on accessor data, a plurality of accessor identifiers that correspond to the particular accessor. The accessor data may be stored at a database.

At block 1204, access management system 100 generates mapping data correlating the account identifier to the plurality of accessor identifiers. The mapping data may be stored at a database as restriction data.

At block 1206, access management system 100 denies, based on the mapping data, any access requests that specify the account identifier but fail to specify at least one accessor identifier of the plurality of accessor identifiers. In other words, access management system 100 may only grant access requests that specify the account identifier and an accessor identifier corresponding to the particular accessor associated with the account identifier.

7.6 Correlating Accessors to Account Identifiers

Figure 13:
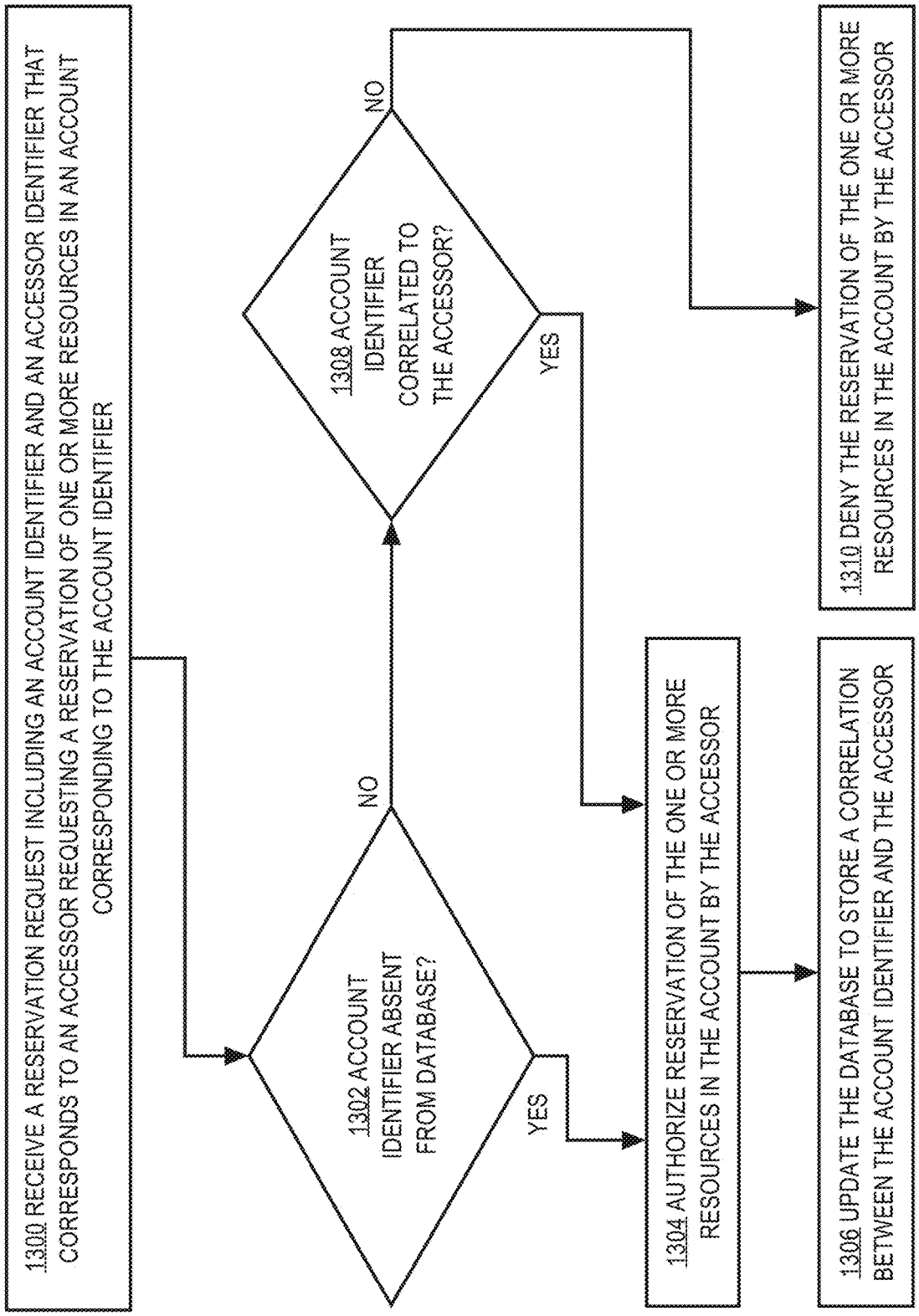
FIG. 13 is a flowchart illustrating an approach for automatically correlating account accessors to account identifiers, according to one embodiment.

FIG. 13 is a flowchart illustrating an approach for automatically correlating account accessors to account identifiers, according to one embodiment. At block 1300, access management system 100 receives a reservation request that includes an account identifier and an accessor identifier. The accessor identifier corresponds to an accessor requesting a reservation of one or more resources in an account that corresponds to the account identifier.

At block 1302, access management system 100 determines whether the account identifier is absent from a database configured to store access data that includes account identifiers and accessor identifiers. The account identifiers correspond to accounts that have been accessed by accessors corresponding to the accessor identifiers. If the account identifier is absent from the database, block 1302 proceeds to block 1304. Otherwise, block 1302 proceeds to block 1308.

In some example embodiments, the database may be further configured to store accessor data that correlates different accessor identifiers to a single accessor. In some example embodiments, the different accessor identifiers may include different accessor names that each correspond to a same reference number for the single accessor. In some example embodiments, the different accessor identifiers may include different accessor names that are each correlated to the single accessor based on a similarity in an amount of resources that is reserved for each of the different accessor names.

At block 1304, access management system 100 authorizes the reservation of the one or more resources in the account by the accessor. At block 1306, access management system 100 updates the database to store a correlation between the account identifier and the accessor. Block 1304 may be performed at any time relative to block 1306.

In some example embodiments, authorizing the reservation may involve selecting a restriction template that corresponds to the accessor and authorizing the reservation of the one or more resources if the reservation request satisfies all properties of the restriction template. In some example embodiments, the properties of the restriction template may be inherited from a different restriction template that corresponds to a particular category of the accessor. In some example embodiments, the properties of the restriction template may limit the reservation request to a predetermined amount of resources. In some example embodiments, the properties of the restriction template may limit a frequency of receiving reservation requests from the accessor.

In some example embodiments, updating the database may involve receiving a fulfillment request that includes the account identifier and a different accessor identifier; determining that the different accessor identifier corresponds to the accessor; and in response to the determination, authorizing the fulfillment request. In some example embodiments, the determination may involve determining that the accessor identifier and the different accessor identifier have similar values.

At block 1308, access management system 100 determines whether the access data correlates the account identifier to the accessor or a different accessor. If the access data correlates the account identifier to the accessor, block 1308 proceeds to block 1304. If the access data correlates the account identifier to the different accessor, block 1308 proceeds to block 1310.

At block 1310, the account identifier to the accessor denies the reservation of the one or more resources in the account by the accessor.

7.7 Applying Restriction Templates

Figure 14:
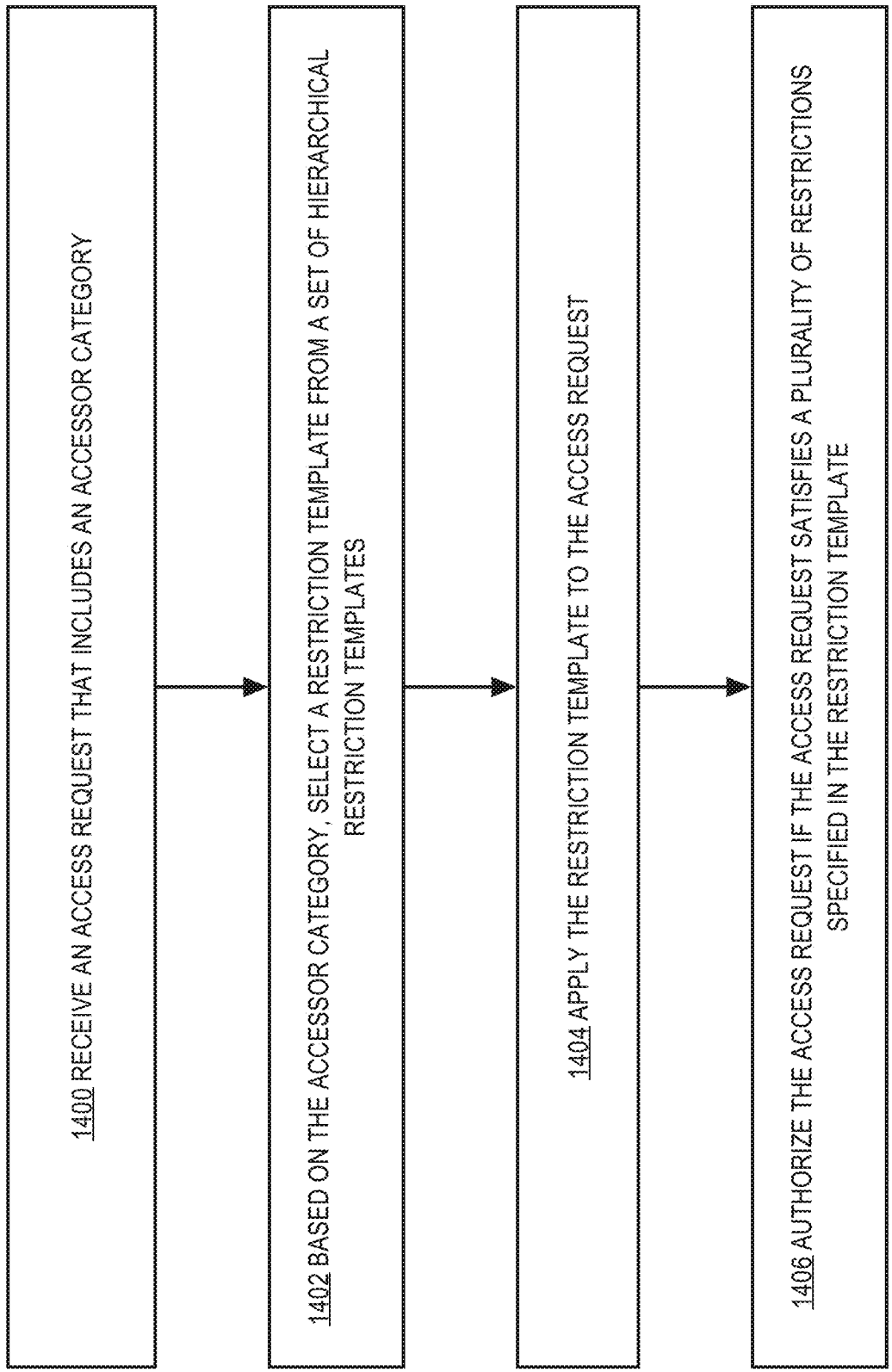
FIG. 14 is a flowchart illustrating an approach for applying restriction templates, according to one embodiment.

FIG. 14 is a flowchart illustrating an approach for applying restriction templates, according to one embodiment. At block 1400, access management system 100 receives an access request that includes an accessor category.

At block 1402, access management system 100 selects, based on the accessor category, a restriction template from a set of hierarchical restriction templates. A database may store mapping data that correlates the restriction template to the accessor category.

At block 1404, access management system 100 applies the restriction template to the access request. The restriction template specifies a plurality of access restrictions.

At block 1406, access management system 100 authorizes the access request if the access request satisfies the plurality of access restrictions specified in the restriction template. In other words, the access request may be denied if it fails to satisfy any access restriction in the restriction template.

7.8 Enforcing Card-Present/Card-Absent Restrictions

Figure 15:
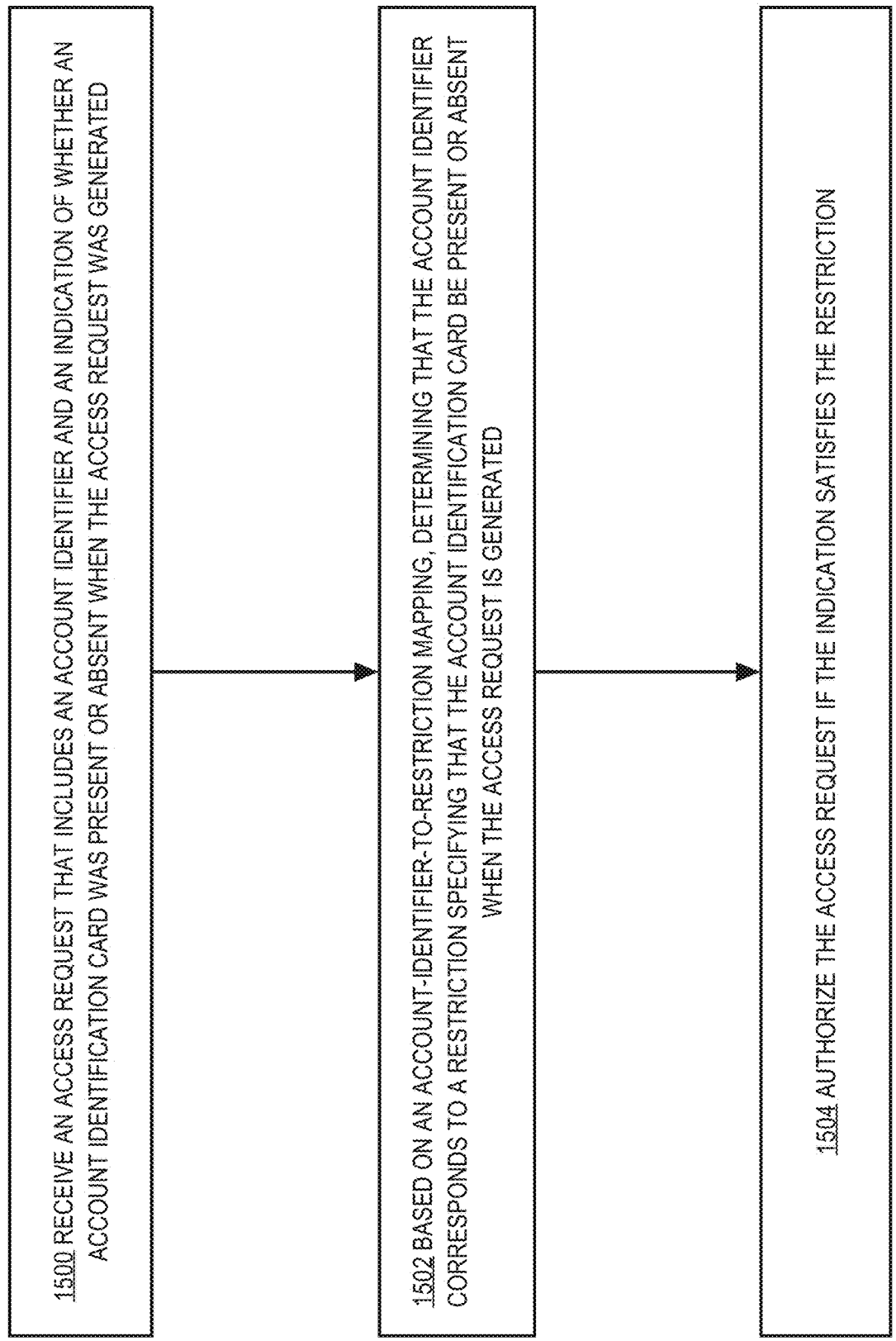
FIG. 15 is a flowchart illustrating an approach for controlling access based on the presence or absence of an account identification card, according to one embodiment.

FIG. 15 is a flowchart illustrating an approach for controlling access based on the presence or absence of an account identification card, according to one embodiment. At block 1500, access management system 100 receives an access request that includes an account identifier and an indication of whether an account identification card was present or absent when the access request was generated. For example, an access request generated, at least in part, by a chip reader may include an indication that a physical card was present when the access request was generated. In contrast, an access request generated based on a virtual card may include an indication that a physical card was absent when the access request was generated.

At block 1502, access management system 100 determines, based on mapping data, that the account identifier corresponds to a restriction specifying that the account identification card be present or absent when the access request is generated. The mapping data correlates account identifiers to restrictions. For example, the mapping data may indicate that an account identifier stored on a magnetic stripe corresponds to a restriction specifying that a physical card be present when an access request is generated. Additionally or alternatively, the mapping data may indicate that an account identifier associated with a virtual card correspond to a restriction specifying that a physical card be absent when an access request is generated.

At block 1504, access management system 100 authorizes the access request if the indication satisfies the restriction. For example, if both an access request and a restriction specify an account identifier associated with a physical card and a CP indication, the access request may be granted. As another example, if both an access request and a restriction specify an account identifier associated with a virtual card and a CNP indication, the access request may be granted.

7.9 Controlling Access Based on Geolocation Data

Figure 16:
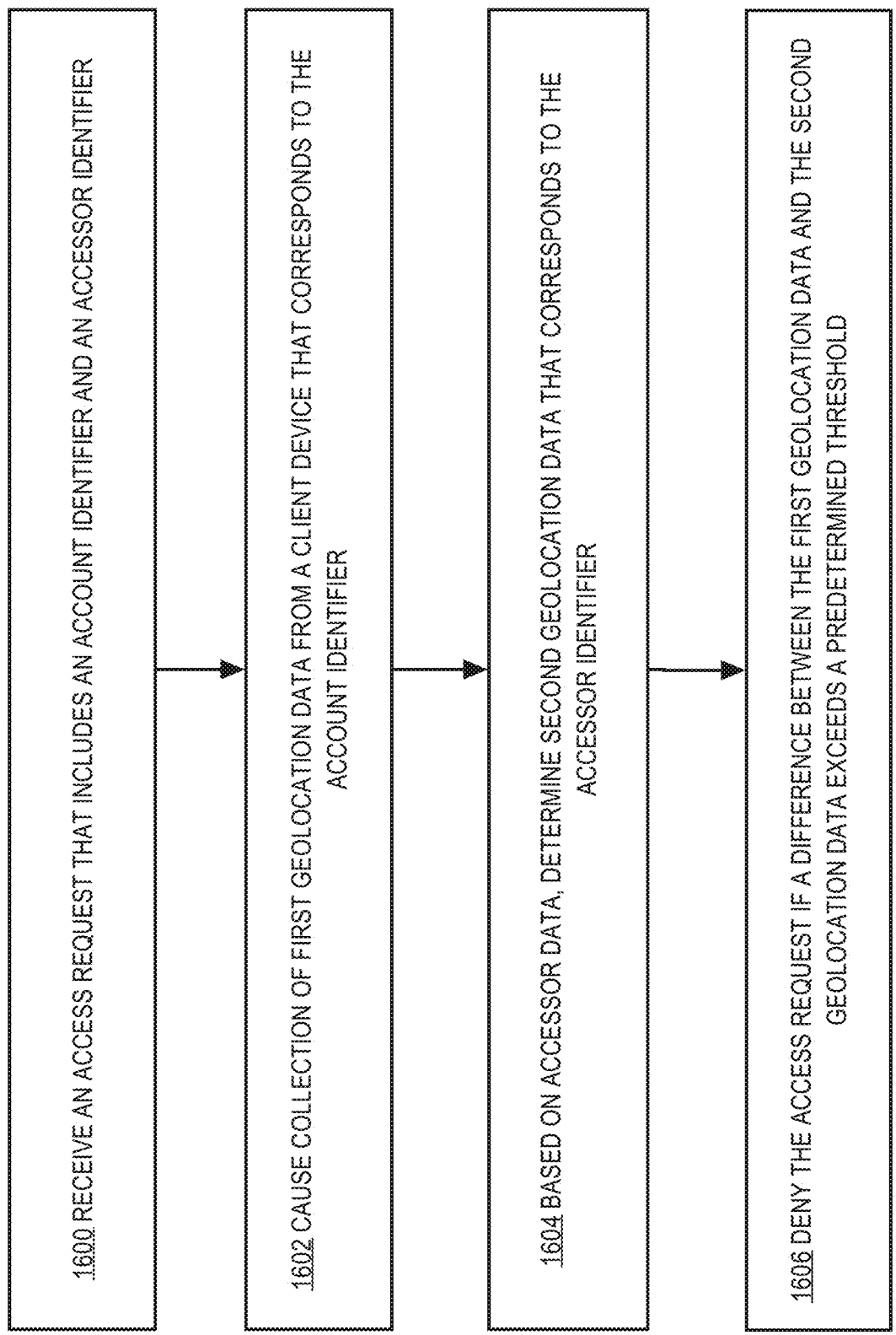
FIG. 16 is a flowchart illustrating an approach for controlling access based on geolocation data, according to one embodiment.

FIG. 16 is a flowchart illustrating an approach for controlling access based on geolocation data, according to one embodiment. At block 1600, access management system 100 receives an access request that includes an account identifier and an accessor identifier.

At block 1602, access management system 100 causes collection of first geolocation data from a client device that corresponds to the account identifier. In some example embodiments, access management system 100 may determine that the client device corresponds to the account identifier based on mapping data stored in a database (e.g., database 102). The mapping data may correlate user information to account identifiers. The user information may include hardware and/or software identifiers, such as media access control addresses and/or UUIDs.

At block 1604, access management system 100 determines, based on accessor data, second geolocation data that corresponds to the accessor identifier. The accessor data may be stored in a database as profile data corresponding to one or more account accessors.

At block 1606, access management system 100 denies the access request if a difference between the first geolocation data and the second geolocation data exceeds a predetermined threshold. In contrast, access management system 100 grants the access request if the first geolocation data is within a predetermined range of the second geolocation data or vice versa (assuming that any other requirements for access are also met).

7.10 Recycling Account Identifiers

Figure 17:
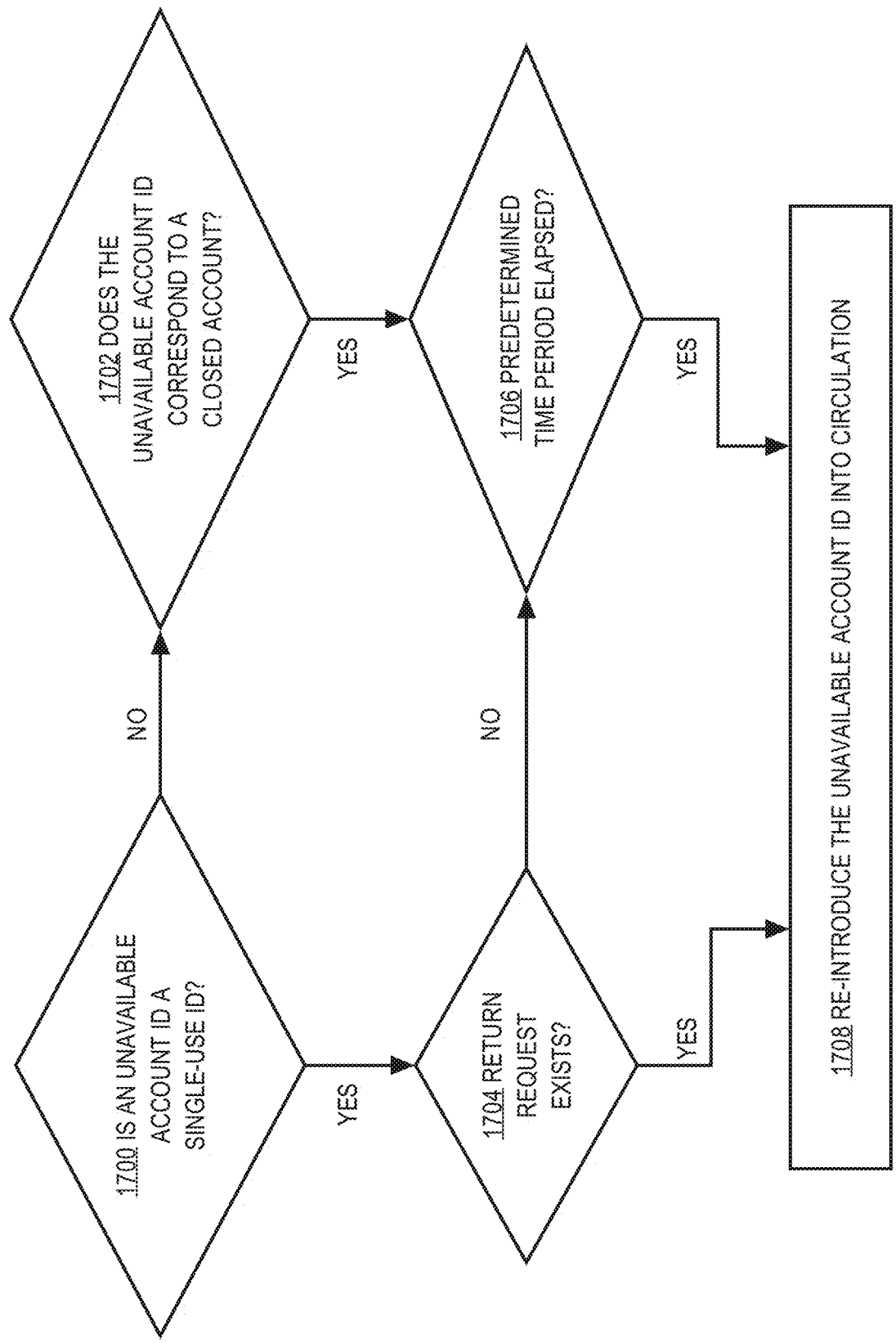
FIG. 17 is a flowchart illustrating an approach for recycling account identifiers, according to one embodiment.

FIG. 17 is a flowchart illustrating an approach for recycling account identifiers, according to one embodiment. At block 1700, access management system 100 determines whether or not an unavailable account identifier is a single-use account identifier. The unavailable account identifier may be an account identifier that has been removed from circulation. If the unavailable account is a single-use account identifier, block 1700 proceeds to block 1704. Otherwise, block 1700 proceeds to block 1702.

At block 1702, access management system 100 determines whether or not the unavailable account identifier corresponds to a closed account. If the unavailable account identifier does correspond to a closed account, block 1702 proceeds to block 1706.

At block 1704, access management system 100 determines whether or not any return request corresponds to the single-use account identifier. If a return request exists, access management system 100 may further determine whether or not an amount of resources specified in the return request matches an amount of resources specified in an access request that was previously authorized for the single-use account identifier. If so, block 1704 proceeds to block 1708. Otherwise block 1704 proceeds to block 1706.

At block 1706, access management system 100 determines whether or not a predetermined time period has elapsed since a time when the unavailable account identifier was last used. If so, block 1706 proceeds to block 1708. Otherwise, block 1706 may either exit the process or proceed to block 1700 to iterate the process for another account identifier.

At block 1708, access management system 100 re-introduces the unavailable account identifier into circulation. This may involve assigning the unavailable account identifier to a virtual card and/or a physical card.

8.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 18:
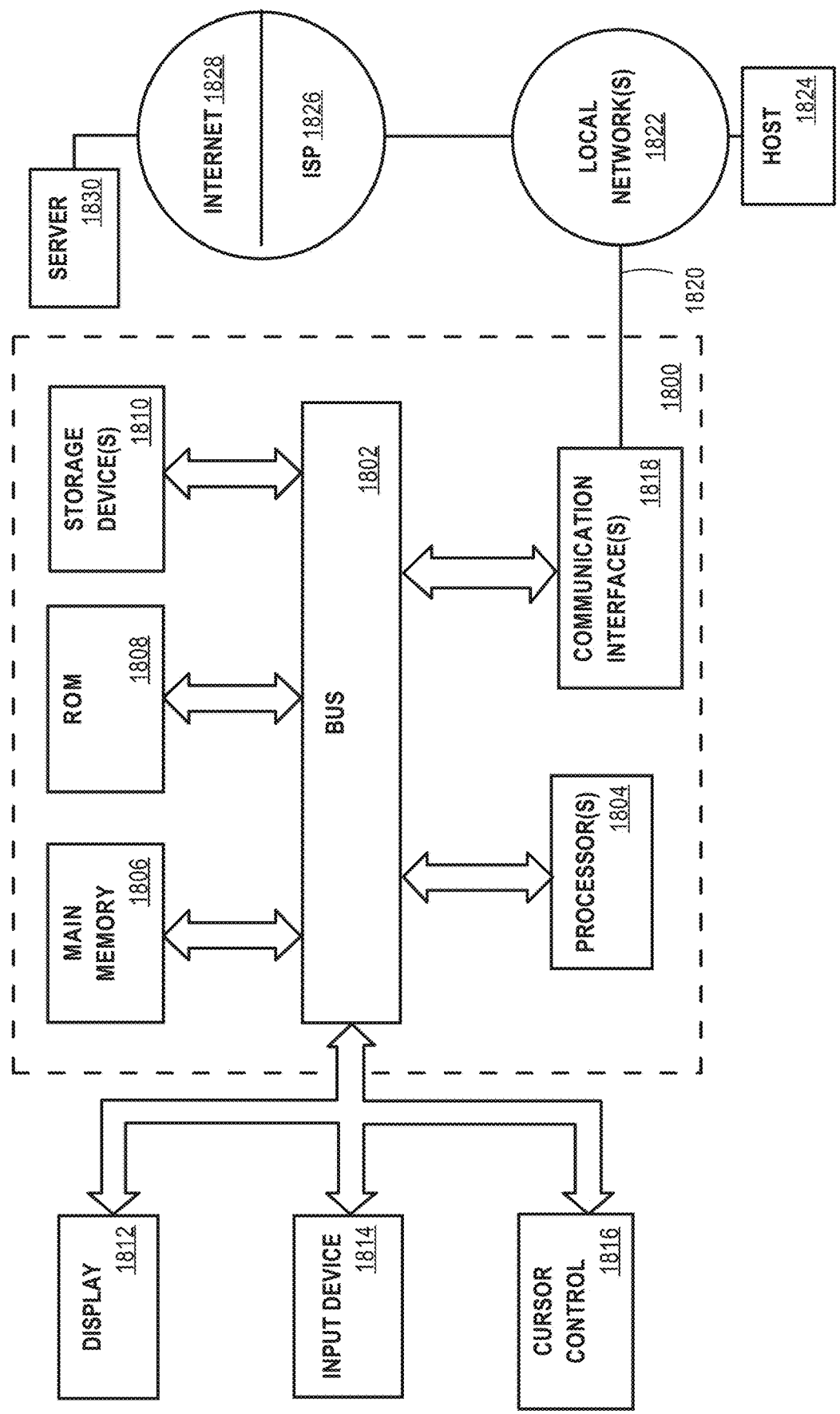
FIG. 18 is a block diagram illustrating a computer system upon which an embodiment may be implemented.

For example, FIG. 18 is a block diagram that depicts a computer system 1800 upon which an embodiment may be implemented. In other embodiments, other computer architectures may be used. In the embodiment shown in FIG. 18, computer system 1800 includes a bus 1802 or other communication mechanism for communicating information, and a hardware processor 1804 coupled with bus 1802 for processing information. Hardware processor 1804 may be, for example, a general purpose microprocessor.

Computer system 1800 also includes a main memory 1806, such as a random access memory (RAM) or other dynamic storage device, coupled to bus 1802 for storing information and instructions to be executed by processor 1804. Main memory 1806 also may be used for storing temporary variables or other intermediate information during execution of instructions to be executed by processor 1804. Such instructions, when stored in non-transitory storage media accessible to processor 1804, render computer system 1800 into a special-purpose machine that is customized to perform the operations specified in the instructions.

Computer system 1800 further includes a read only memory (ROM) 1808 or other static storage device coupled to bus 1802 for storing static information and instructions for processor 1804. A storage device 1810, such as a magnetic disk or optical disk, is provided and coupled to bus 1802 for storing information and instructions.

Computer system 1800 may be coupled via bus 1802 to a display 1812, such as a cathode ray tube (CRT), for displaying information to a computer user. An input device 1814, including alphanumeric and other keys, is coupled to bus 1802 for communicating information and command selections to processor 1804. Another type of user input device is cursor control 1816, such as a mouse, a trackball, or cursor direction keys for communicating direction information and command selections to processor 1804 and for controlling cursor movement on display 1812. This input device typically has two degrees of freedom in two axes, a first axis (e.g., x) and a second axis (e.g., y), that allows the device to specify positions in a plane.

Computer system 1800 may implement the techniques described herein using customized hard-wired logic, one or more ASICs or FPGAs, firmware and/or program logic which in combination with the computer system causes or programs computer system 1800 to be a special-purpose machine. According to one embodiment, the techniques herein are performed by computer system 1800 in response to processor 1804 executing one or more sequences of one or more instructions contained in main memory 1806. Such instructions may be read into main memory 1806 from another storage medium, such as storage device 1810. Execution of the sequences of instructions contained in main memory 1806 causes processor 1804 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1810. Volatile media includes dynamic memory, such as main memory 1806. Such media may also be transitory or non-transitory, except where specified otherwise. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Various forms of media may be involved in carrying one or more sequences of one or more instructions to processor 1804 for execution. For example, the instructions may initially be carried on a magnetic disk or solid state drive of a remote computer. The remote computer can load the instructions into its dynamic memory and send the instructions over a telephone line using a modem. A modem local to computer system 1800 can receive the data on the telephone line and use an infra-red transmitter to convert the data to an infra-red signal. An infra-red detector can receive the data carried in the infra-red signal and appropriate circuitry can place the data on bus 1802. Bus 1802 carries the data to main memory 1806, from which processor 1804 retrieves and executes the instructions. The instructions received by main memory 1806 may optionally be stored on storage device 1810 either before or after execution by processor 1804.

Computer system 1800 also includes a communication interface 1818 coupled to bus 1802. Communication interface 1818 provides a two-way data communication coupling to a network link 1820 that is connected to a local network 1822. For example, communication interface 1818 may be an integrated services digital network (ISDN) card, cable modem, satellite modem, or a modem to provide a data communication connection to a corresponding type of telephone line. As another example, communication interface 1818 may be a local area network (LAN) card to provide a data communication connection to a compatible LAN. Wireless links may also be implemented. In any such implementation, communication interface 1818 sends and receives electrical, electromagnetic or optical signals that carry digital data streams representing various types of information.

Network link 1820 typically provides data communication through one or more networks to other data devices. For example, network link 1820 may provide a connection through local network 1822 to a host computer 1824 or to data equipment operated by an Internet Service Provider (ISP) 1826. ISP 1826 in turn provides data communication services through the world wide packet data communication network now commonly referred to as the "Internet" 1828. Local network 1822 and Internet 1828 both use electrical, electromagnetic or optical signals that carry digital data streams. The signals through the various networks and the signals on network link 1820 and through communication interface 1818, which carry the digital data to and from computer system 1800, are example forms of transmission media.

Computer system 1800 can send messages and receive data, including program code, through the network(s), network link 1820 and communication interface 1818. In the Internet example, a server 1830 might transmit a requested code for an application program through Internet 1828, ISP 1826, local network 1822 and communication interface 1818.

The received code may be executed by processor 1804 as it is received, and/or stored in storage device 1810, or other non-volatile storage for later execution.

9.0 Extensions and Alternatives

The disclosed techniques provide various advantages and improvements in the field of access control technology. For example, by assigning different account identifiers to different interfaces of a card, the cardholder can continue to access resources using the card even when one of the account identifiers has been compromised. For example, if the visual interface of a card becomes compromised (e.g., due to a bad actor copying the account identifier from the face of the card), the identifier mapped to the visual interface may be disabled while leaving a magnetic stripe interface and integrated circuit interface operational. Thus, while the cardholder may be inconvenienced somewhat, they retain access to the resources via the remaining operational interfaces. This may reduce the cost of access control technology as less replacement cards will be required and/or the creation of replacement cards is less urgent (e.g., allowing for more efficient batch processing). It may also increase the effectiveness of access control as cardholders and issuers may be more willing to block access to resources for specific access identifiers, knowing that alternate means of obtaining access are still available via the card.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A transaction processing system comprising:

a database configured to store:

accessor data including credit card numbers, merchant identifiers, and correlations that link merchant identifiers to multiple merchant names, wherein the accessor data indicate which of the merchant identifiers correspond to merchants that are authorized to receive payment using which credit card numbers; and restriction templates including merchant categories and purchase restrictions, wherein the restriction templates indicate which purchase restrictions apply to which merchant categories; and an authorization system including one or more processors and one or more computer-readable media storing instructions that, when executed by the one or more processors, cause the authorization system to perform operations comprising:

receiving a transaction request identifying a credit card number and a merchant;

identifying, from the accessor data, multiple different merchant names linked to the identified merchant;

searching the accessor data for the identified credit card number;

responsive to the searching finding that any of the multiple different merchant names linked to the identified merchant are authorized to receive payment using the identified credit card number, authorizing the identified merchant to receive payment using the identified credit card number;

selecting one of the restriction templates to apply to the transaction request based on the identified merchant, the selected restriction template including one or more purchase restrictions;

determining whether the transaction request satisfies the purchase restrictions of the selected restriction template; and responsive to determining that the identified merchant is authorized to receive payment using the identified credit card number and that the transaction request satisfies the purchase restrictions of the selected restriction template, authorizing the transaction request.

2. The transaction processing system of claim 1, wherein determining whether the identified merchant is authorized to receive payment using the identified credit card comprises:

searching the accessor data for the identified credit number;

responsive to determining the identified credit card number is absent from the accessor data, updating the accessor data to indicate the identified merchant is authorized to receive payment using the identified credit card number; and authorizing the identified merchant to receive payment using the identified credit card number.

3. The transaction processing system of claim 1, wherein determining whether the identified merchant is authorized to receive payment using the identified credit card comprises:

searching the accessor data for the identified credit number; and responsive to the searching finding another merchant is authorized to receive payment using the identified credit card number, denying authorization for the identified merchant to receive payment using the identified credit card number.

4. The transaction processing system of claim 1, wherein the transaction request further identifies a transaction amount, the one or more purchase restrictions include a maximum transaction amount, a maximum transaction frequency, and a maximum transaction velocity, and determining whether the transaction request satisfies the purchase restrictions comprises:

determining whether the transaction amount exceeds the maximum transaction amount;

determining, from a transaction history of the identified credit card number, whether authorizing the transaction request would cause a cumulative use of the identified credit card number to exceed the maximum transaction frequency; and determining, from the transaction history of the identified credit card number, whether authorizing the transaction request would cause a cumulative use of the identified credit card number to exceed the maximum transaction velocity.

5. The transaction processing system of claim 1, wherein the correlations that link multiple merchant names to merchant identifiers are determined automatically based on similarities between the multiple merchant names.

6. The transaction processing system of claim 1, wherein the restriction templates include general templates for categories of merchants and specific templates for specific merchants, the specific templates inheriting purchase restrictions from the general templates.

7. The transaction processing system of claim 6, wherein selecting one of the restriction templates comprises:

searching the restriction templates for a specific template for the identified merchant; and responsive to the restriction templates not including a specific template for the identified merchant:

identifying a category of the identified merchant; and selecting a general template corresponding to the category of the identified merchant.

8. The transaction processing system of claim 1, wherein the database is further configured to store transaction data including transaction histories of the credit card numbers, and determining whether the transaction request satisfies the purchase restrictions is based on the transaction data.

9. The transaction processing system of claim 8, wherein the purchase restrictions include a transaction frequency or a transaction velocity, and determining whether the transaction request satisfies the purchase restrictions includes determining, from a transaction history of the identified credit card number, whether authorizing the transaction request would cause a cumulative use of the identified credit card number to exceed the transaction frequency or transaction velocity.

10. The transaction processing system of claim 9, wherein the identified credit card number is associated with a financial account, and the cumulative use of the identified credit card number includes purchases made using the identified credit card number as well as purchases made using one or more additional credit card numbers associated with the financial account.

11. The transaction processing system of claim 9, wherein the selected restriction template is for a merchant category, and the cumulative use of the identified credit card number includes all purchases using the identified credit card number from merchants in the merchant category.

12. The transaction processing system of claim 1, wherein the transaction request identifies a transaction amount, the purchase restrictions include a maximum transaction amount, and determining whether the transaction request satisfies the purchase restrictions includes determining whether the transaction amount exceeds the maximum transaction amount.

13. A method implemented by a transaction processing system including a database and an authorization system, the database configured to store accessor data including credit card numbers and merchant identifiers, the accessor data indicating which of the merchant identifiers correspond to merchants that are authorized to receive payment using which credit card numbers, the authorization system including one or more processors and one or more computer-readable media storing instructions for performing the method, the method comprising the authorization system:

receiving a transaction request identifying a credit card number, a merchant, and a transaction amount;

querying the database for merchants that are authorized to receive payment using the identified credit card number, the querying generating a query result;

determining that the identified merchant is authorized to receive payment using the identified credit card number based on the query result indicating the identified merchant is associated with the identified credit card number in the database;

identifying a restriction template to apply to the transaction request based on the identified merchant, the restriction template including a set of purchase restrictions, the set of purchase restrictions comprising a maximum transaction amount, a maximum transaction frequency, and a maximum transaction velocity;

determining whether the transaction request satisfies the set of purchase restrictions of the selected restriction template, determining whether the transaction request satisfies the set of purchase restrictions comprising:
  determining whether the transaction amount exceeds the maximum transaction amount;
  determining, from a transaction history of the identified credit card number, whether authorizing the transaction request would cause a cumulative use of the identified credit card number to exceed the maximum transaction frequency; and
  determining, from the transaction history of the identified credit card number, whether authorizing the transaction request would cause a cumulative use of the identified credit card number to exceed the maximum transaction velocity; and responsive to determining that the identified merchant is authorized to receive payment using the identified credit card number and that the transaction request satisfies the set of purchase restrictions of the selected restriction template, authorizing the transaction request.

14. The method of claim 13, wherein determining whether the identified merchant is authorized to receive payment using the identified credit card comprises:
  determining, from the query result, the identified credit card number is absent from the database;
  generating an instruction to update the database to include that the identified merchant is authorized to receive payment using the identified credit card number; and
  authorizing the identified merchant to receive payment using the identified credit card number.

15. The method of claim 13, wherein the identified restriction template is selected from a set of restriction templates that includes general templates for categories of merchants and specific templates for specific merchants, and selecting the identified restriction template comprises:
  searching the set of restriction templates for a specific template for the identified merchant; and
  responsive to the set of restriction templates not including a specific template for the identified merchant:
    identifying a category of the identified merchant; and
    selecting a general template corresponding to the category of the identified merchant.

16. The method of claim 13, wherein the accessor data further comprises correlations that link merchant identifiers to multiple merchant names, and determining that the identified merchant is authorized to receive payment using the identified credit card number comprises:
  identifying, from the accessor data, multiple different merchant names linked to the identified merchant; and
  responsive to the query result indicating any merchant name linked to the identified merchant is authorized to receive payment using the identified credit card number, authorizing the identified merchant to receive payment using the identified credit card number.

17. The method of claim 13, wherein the identified restriction template is for a merchant category, the identified credit card number is associated with a financial account, and cumulative use of the identified credit card number includes purchases from merchants in the merchant category made using the identified credit card number and one or more additional credit card numbers associated with the financial account.

18. A non-transitory computer-readable medium storing instructions executable by a transaction processing system that includes a database and an authorization system, the database configured to store a set of restriction templates, and the authorization system including one or more processors, wherein the instructions, when executed by the one or more processors, cause the authorization system to perform operations comprising:
  receiving a transaction request identifying a credit card number, a merchant, and a transaction amount;
  searching the set of restriction templates in the database for a specific template for the identified merchant;
  responsive to the set of restriction templates not including a specific template for the identified merchant:
    identifying a category of the identified merchant; and
    selecting a general template corresponding to the category of the identified merchant, the general template including purchase restrictions comprising a maximum transaction amount, a maximum transaction frequency, and a maximum transaction velocity;
  determining whether the transaction request satisfies the purchase restrictions of the general template, wherein determining whether the transaction request satisfies the purchase restrictions of the general template comprises:
    determining whether the transaction amount exceeds the maximum transaction amount;
    determining, from a transaction history of the identified credit card number, whether authorizing the transaction request would cause a cumulative use of the identified credit card number to exceed the maximum transaction frequency; and
    determining, from the transaction history of the identified credit card number, whether authorizing the transaction request would cause a cumulative use of the identified credit card number to exceed the maximum transaction velocity; and
  responsive to determining that the transaction request satisfies the purchase restrictions of the general template, authorizing the transaction request.

19. The non-transitory computer-readable medium of claim 18, wherein the operations further comprise querying the database to determine whether the identified merchant is authorized to receive payment using the identified credit card number, and the transaction request is authorized only if the identified merchant is authorized to receive payment using the identified credit card number.

20. The non-transitory computer-readable medium of claim 18, wherein the database is further configured to store accessor data including credit card numbers, merchant identifiers, and correlations that link merchant identifiers to multiple merchant names, the accessor data indicating which of the merchant identifiers correspond to merchants that are authorized to receive payment using which credit card numbers, and wherein authorizing the transaction is further responsive to the accessor data indicating any merchant name linked to the identified merchant is authorized to receive payment using the identified credit card number.

* * * * *